United States Patent [19]

Narita et al.

[11] Patent Number: 5,426,544
[45] Date of Patent: Jun. 20, 1995

[54] SENSITIVITY CORRECTING CIRCUIT OF SERVO SIGNAL DETECTION ON DATA SURFACE AND OFFSET MEASURING CIRCUIT IN MAGNETIC DISK UNIT

[75] Inventors: Teruyuki Narita, Kawasaki; Atsushi Sato, Higashine; Masao Tsunekawa; Hideaki Tanaka, both of Kawasaki, all of Japan

[73] Assignee: Fujitsu Limited, Kawasaki, Japan

[21] Appl. No.: 194,256

[22] Filed: Feb. 10, 1994

Related U.S. Application Data

[62] Division of Ser. No. 875,647, Apr. 28, 1992, Pat. No. 5,347,410.

[30] Foreign Application Priority Data

Apr. 30, 1991 [JP] Japan .................................. 3-098506
Apr. 30, 1991 [JP] Japan .................................. 3-098509

[51] Int. Cl.6 ............................................. G11B 5/596
[52] U.S. Cl. .................... 360/77.04; 395/425; 360/77.05
[58] Field of Search .................... 360/77.06, 77.05, 60; 395/425

[56] References Cited

U.S. PATENT DOCUMENTS 5,185,681  2/1993  Volz et al. .................... 360/77.05
5,262,907 11/1993  Duffy et al. .................. 360/77.05

Primary Examiner—Aristotelis Psitos
Assistant Examiner—James T. Wilson
Attorney, Agent, or Firm—Greer, Burns & Crain, Ltd.

[57] ABSTRACT

A sensitivity correcting circuit offsets a data head outwardly from an ontrack position by a given quantity (X1), reads first and second servo information (A, B) to provide signals ($V_A$, $V_B$), and detects a difference (V1) between the peak values of the signals. Also, the system offsets the data head inwardly from the ontrack position by a given quantity (X2), reads the first and second servo information (A, B) to provide signals ($V_A$, $V_B$), and detects a difference (V2) between the peak values of the signals ($V_A$, $V_B$). The circuit then computes a proportional coefficient K according to the detected values (V1, V2), and according to the proportional coefficient, finds an offset specific to the data head. Or an offset measuring circuit comprises an offset detector for detecting offsets of data heads relative to a servo head according to servo information read by the data heads on data surfaces of the disk media; a measurement timing setting circuit for instructing the offset detector to start a detection process according to a predetermined time schedule; and an interrupter for interrupting, if the command control section decodes an access command such as a read or write command provided by the host unit, the offset detection process, executing the access command at first, and resuming the offset detection process after the access command is completed when the detection process by the offset detector is executed.

8 Claims, 22 Drawing Sheets (B5) INTERRUPT AUTOMATIC ADJUSTMENT.
(CHECK WHETHER OR NOT
CACHE DATA HAS BEEN HIT.)

(C8) MEASURE OFFTRACK OF HEAD 2.
(C9) CONFIRM INTERRUPT REQUEST.
(C10) STORE INTERRUPT POSITION.
(C11) END OF INTERRUPT.

NORMAL SEQUENCE FOR READ COMMAND (B6) ISSUE AUTOMATIC ADJUSTMENT
RESUME COMMAND.

(C12) CONFIRM INTERRUPT POSITION.
(C13) MEASURE OFFSET OF HEAD 3.
(C14) CONFIRM INTERRUPT REQUEST.
(C15) MEASURE OFFRACK OF HEAD 4.

(Cn) INFORM OF COMPLETION OF
AUTOMATIC ADJUSTMENT.

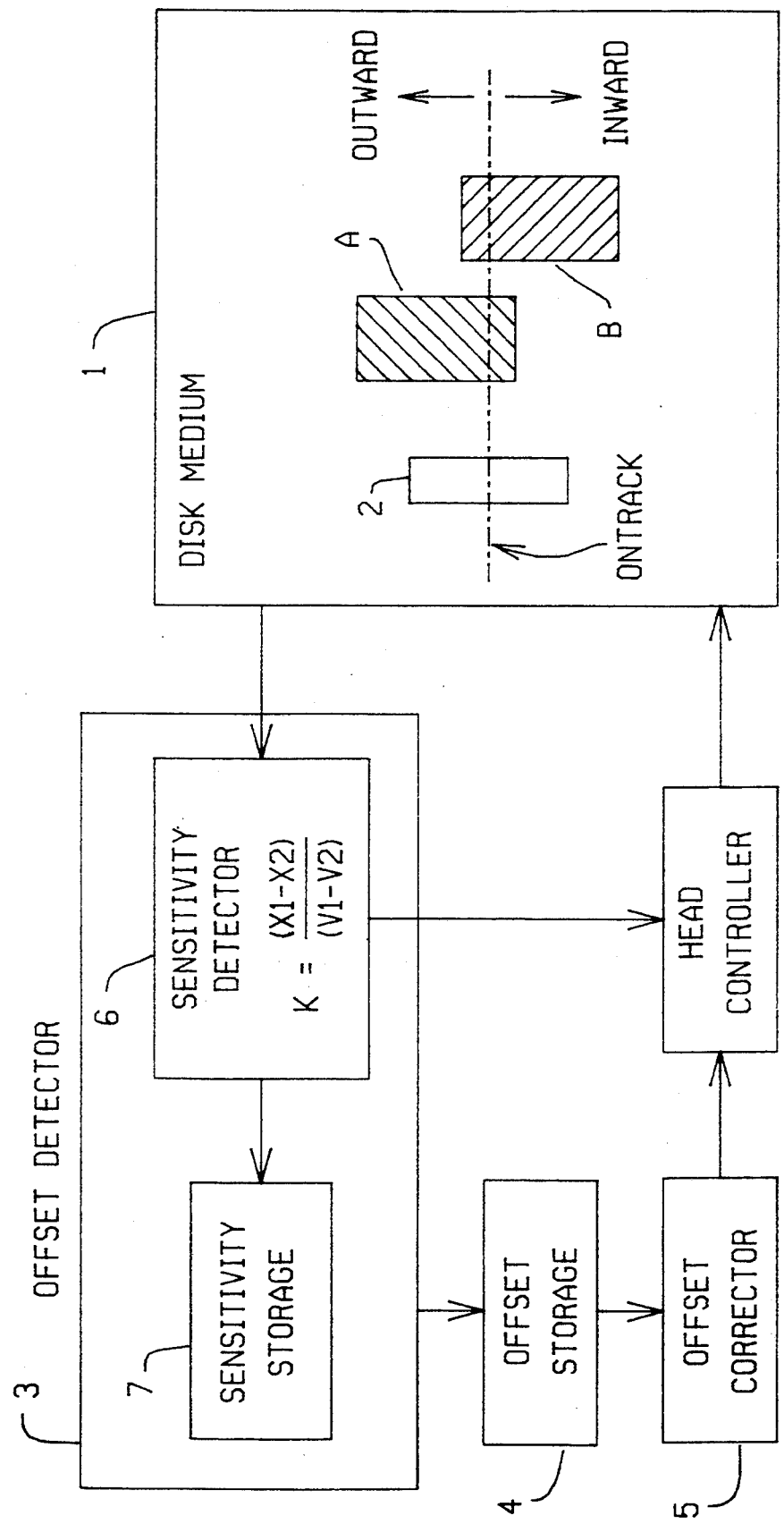

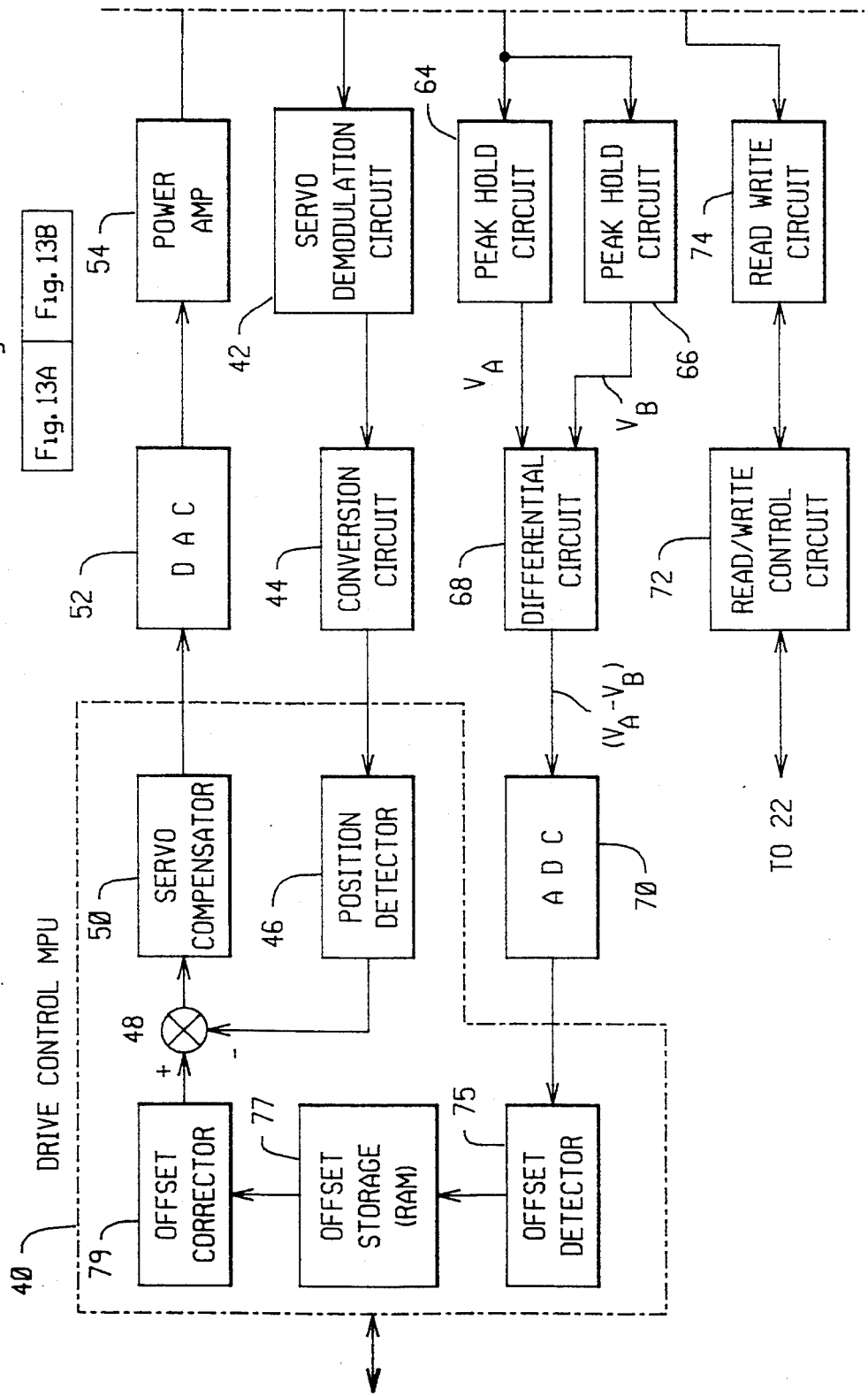

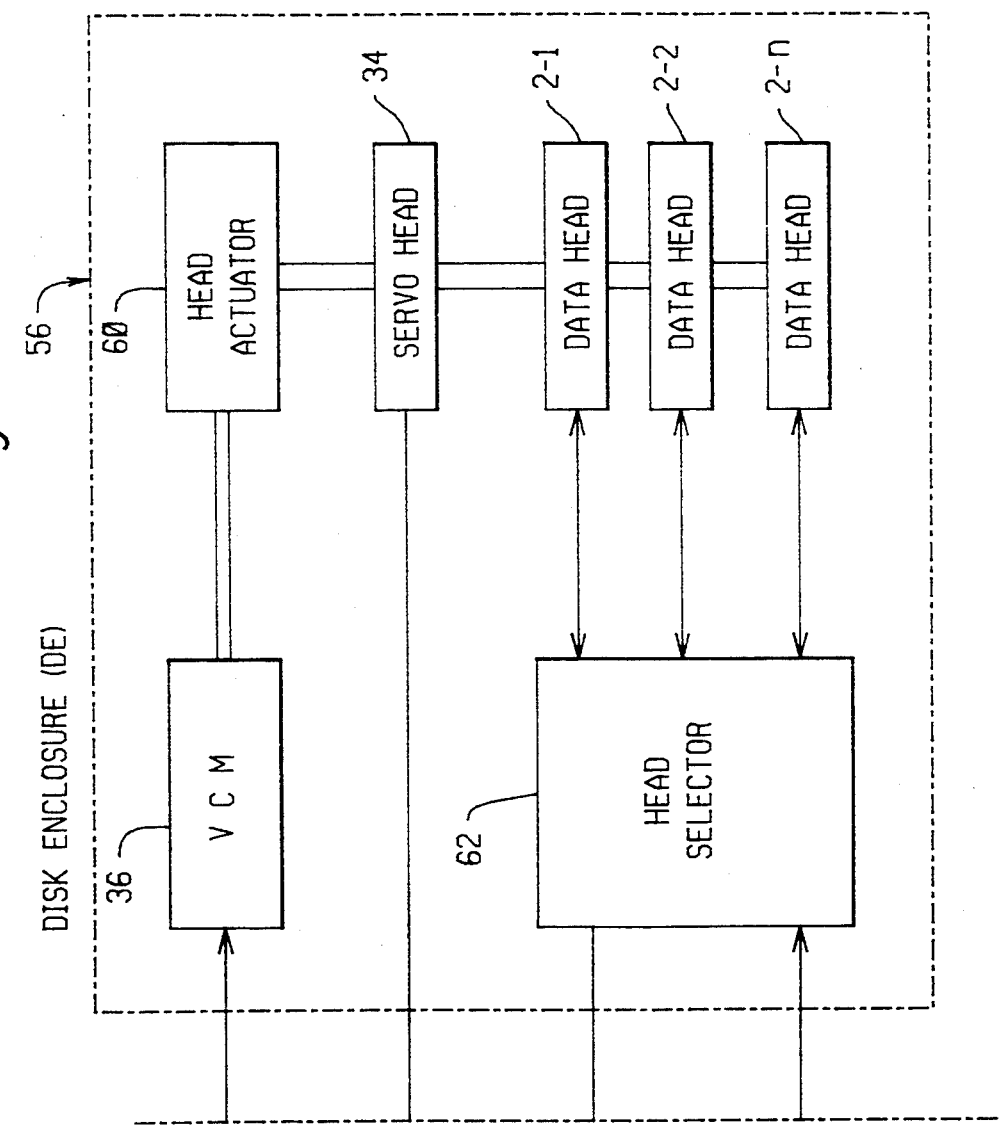

Fig. 15

| HEAD NO. | PROPORTIONAL CONSTANT |
|---|---|
| 1 | K1 |
| 2 | K2 |
| 3 | K3 |
| 4 | K4 |
| 5 | K5 |
| 6 | K6 |
| ---- | ---- |
| 11 | K11 |

Fig. 16

| HEAD NO. | OFFSET |
|---|---|
| 1 | OF1 |
| 2 | OF2 |
| 3 | OF3 |
| 4 | OF4 |
| 5 | OF5 |
| 6 | OF6 |
| ---- | ---- |
| 11 | OF11 |

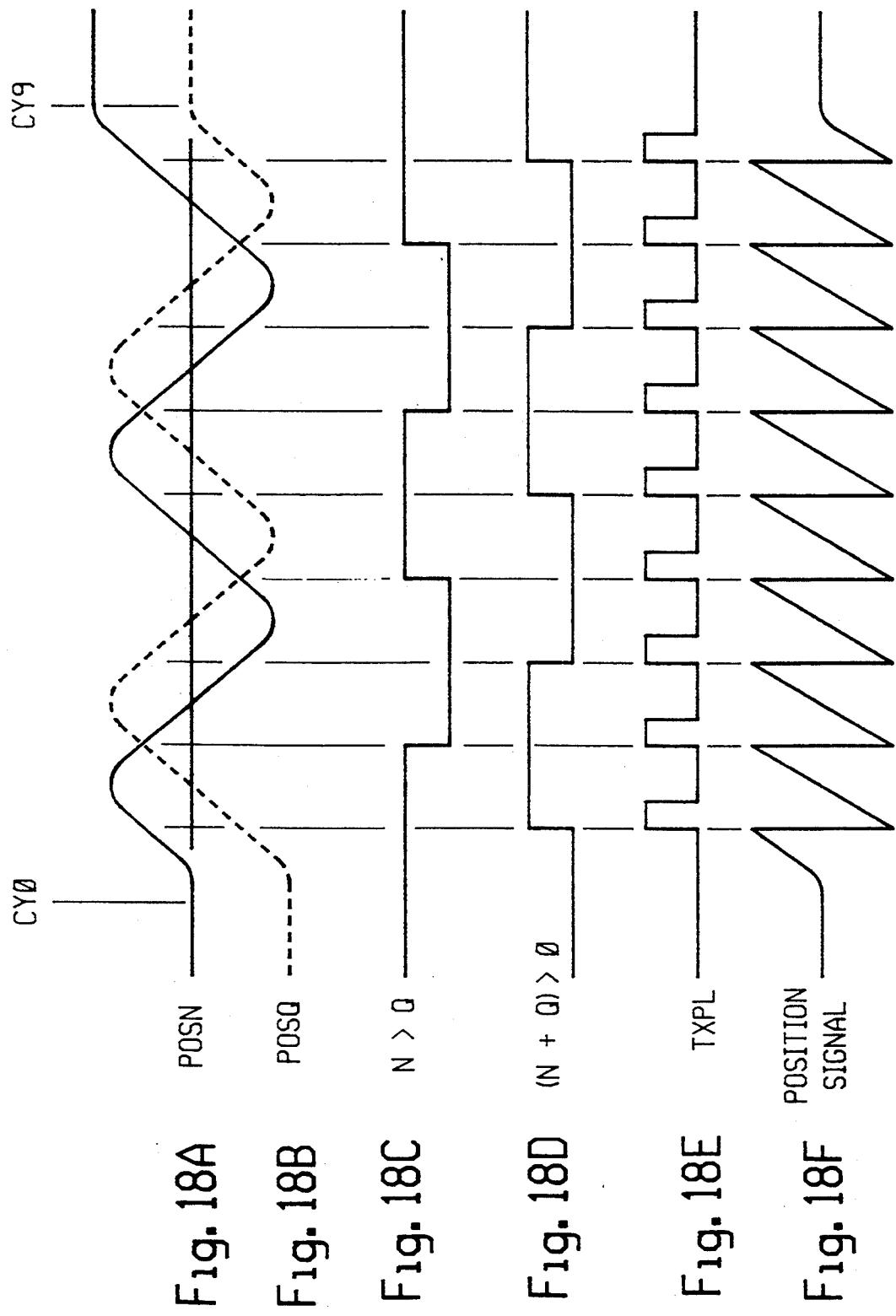

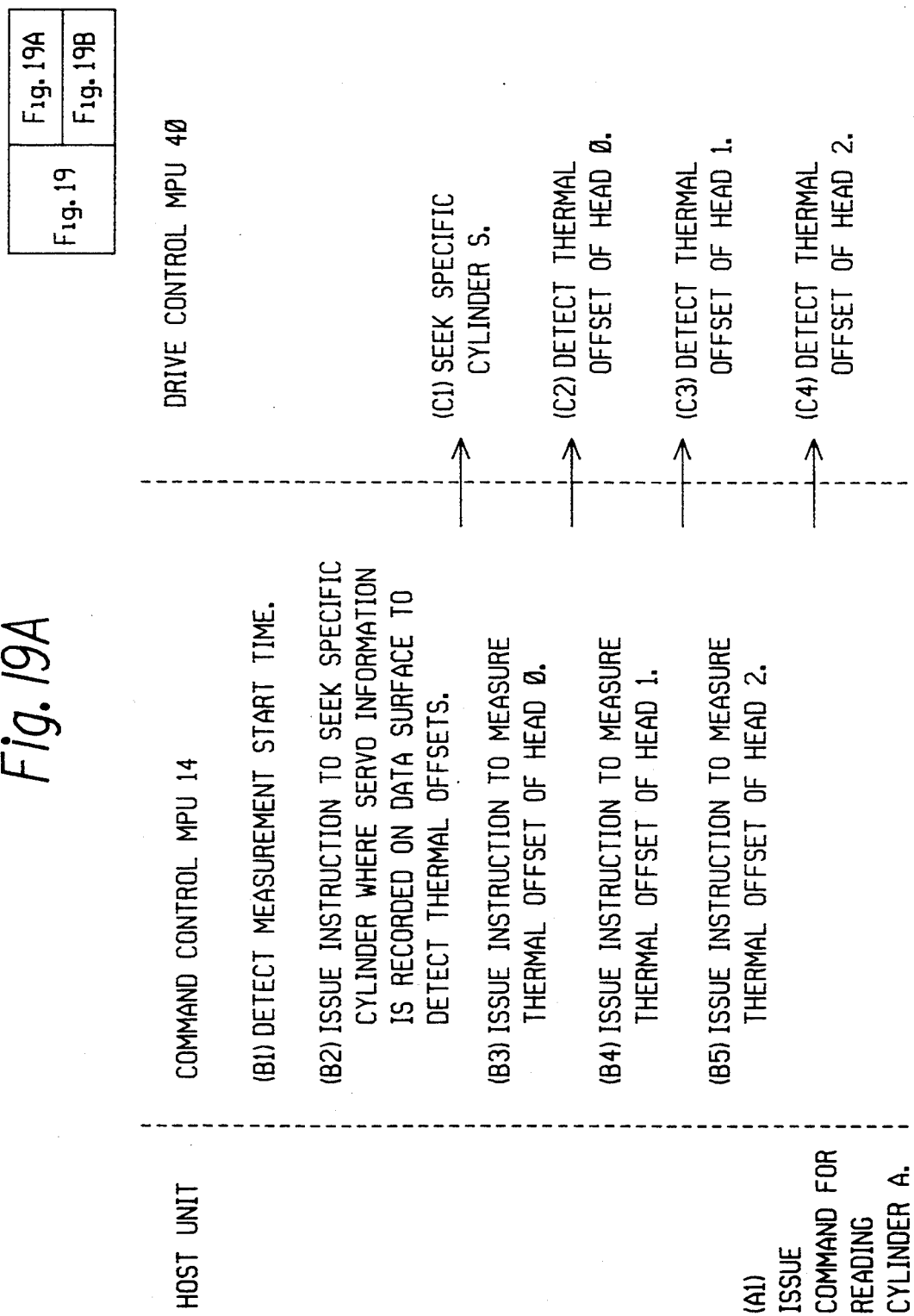

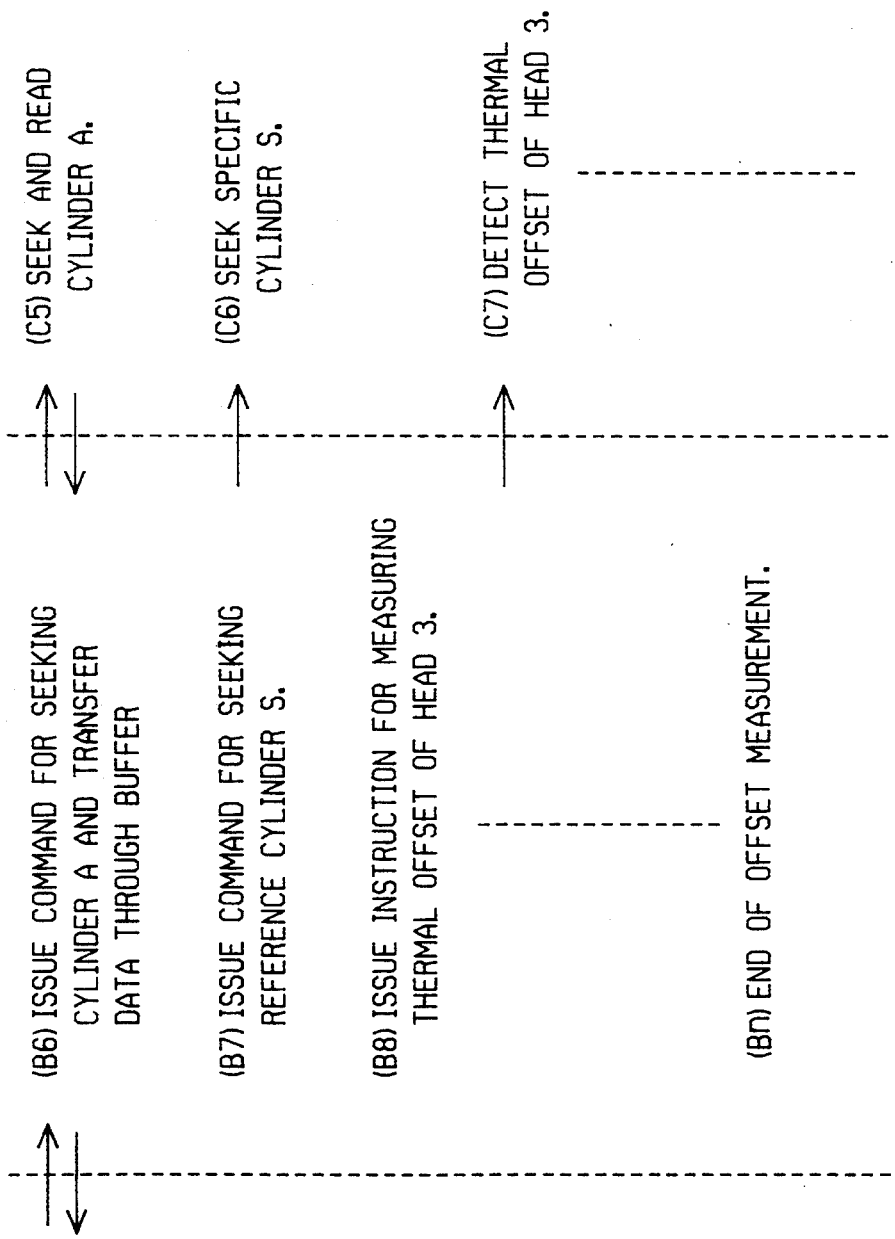

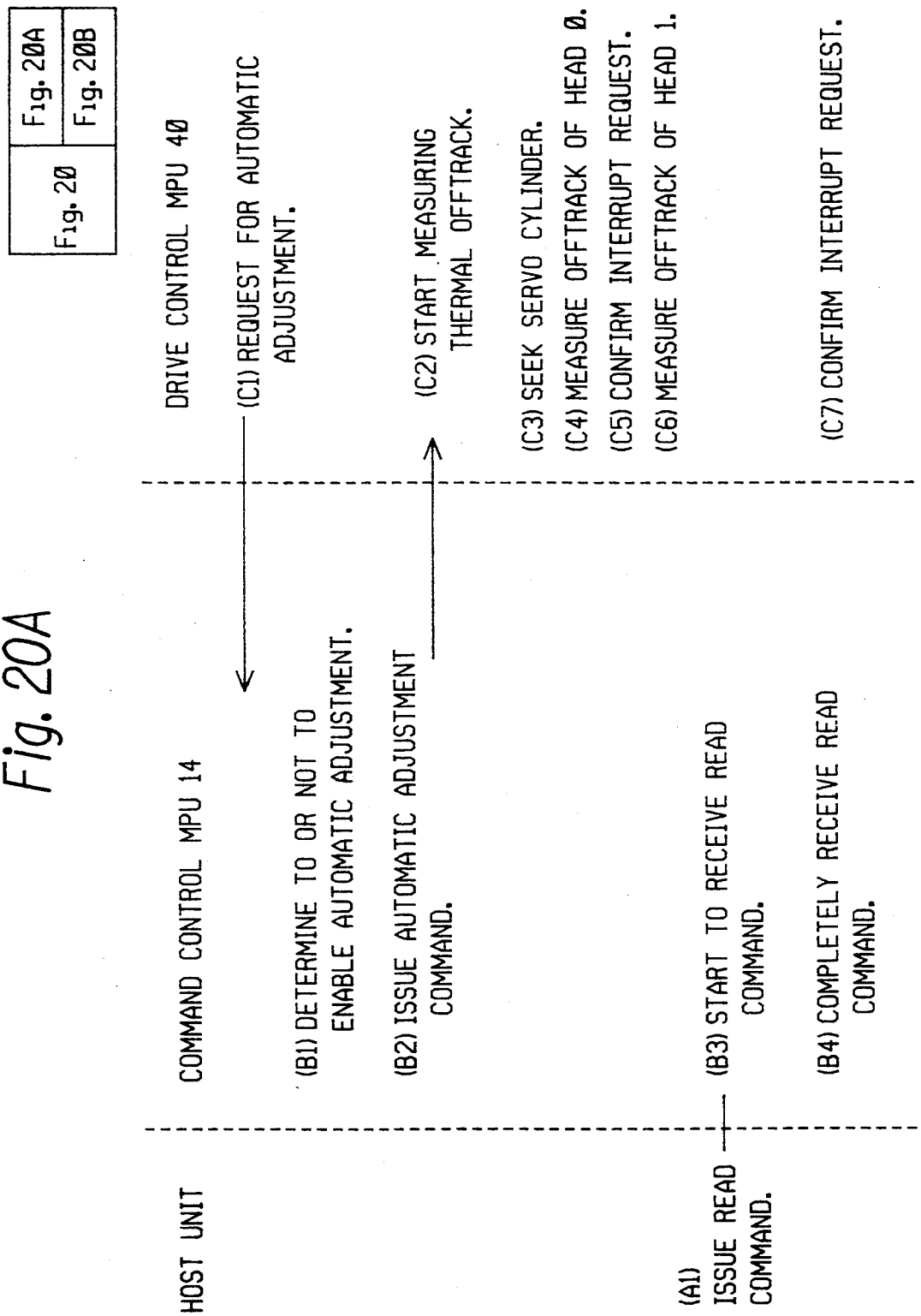

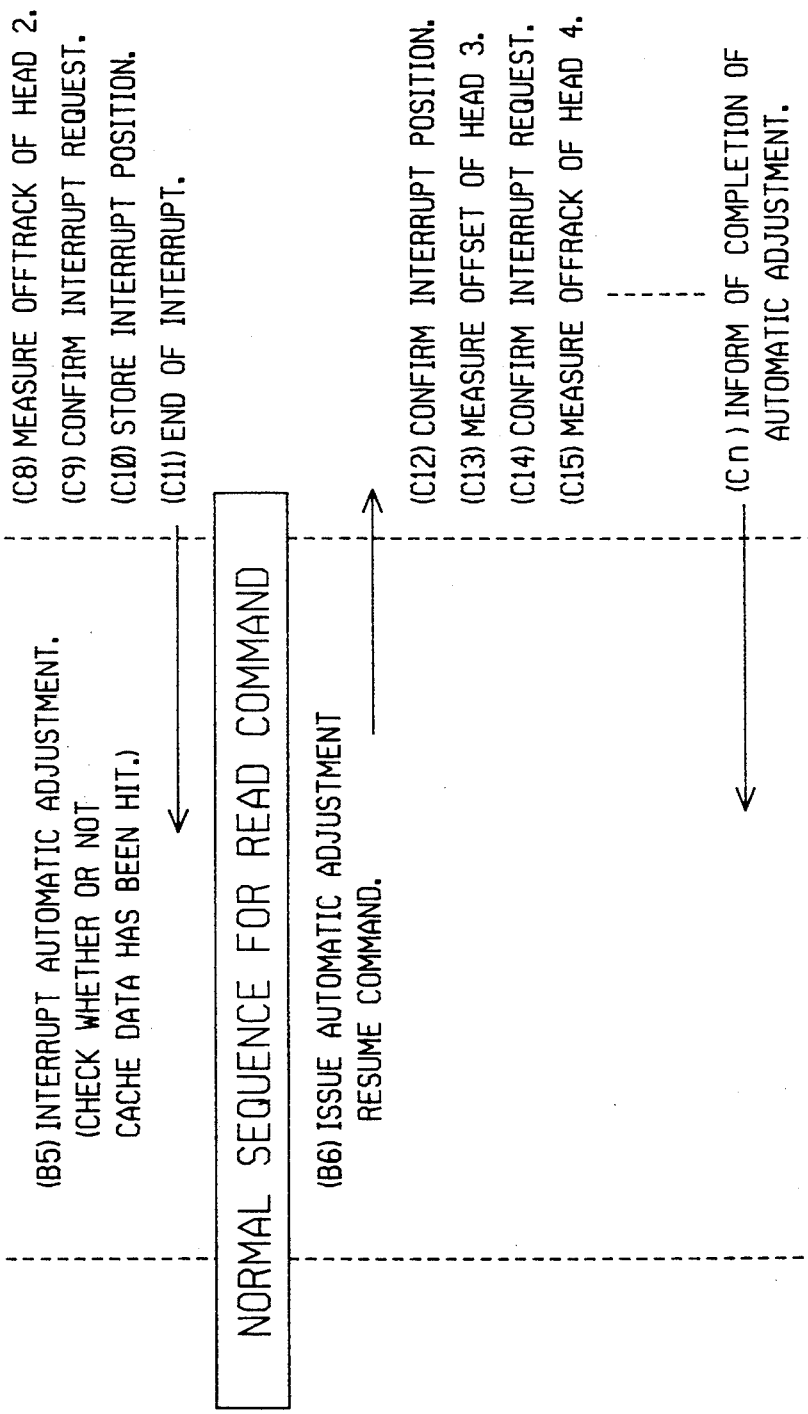

SENSITIVITY CORRECTING CIRCUIT OF SERVO SIGNAL DETECTION ON DATA SURFACE AND OFFSET MEASURING CIRCUIT IN MAGNETIC DISK UNIT

This is a division of application Ser. No. 07/875,647, filed Apr. 28, 1992 now U.S. Pat. No. 5,347,410.

BACKGROUND OF THE INVENTION

1. Field of the Invention

The present invention relates to a magnetic disk unit that controls the position of a head according to servo information recorded on a servo disk and corrects an offset of the head according to servo information recorded on a data surface, and particularly, the invention concerning first or second aspects relates to a sensitivity correcting circuit of servo signal detection on a data surface in a magnetic disk unit, for properly correcting signal sensitivity when reading the servo information on the data surface to detect an offset, and the invention concerning in third or fourth aspects relates to a circuit for measuring the intrinsic offset of a data head to be corrected by head positioning control of a magnetic disk unit during operation of the unit.

2. Description of the Related Art

Increasing the storage capacity of a magnetic disk unit needs to increase the number of disk media arranged on a disk element, the number of heads, and a track density.

When the storage media and track density are increased, a data head that is controlled to be ontrack on a data surface according to servo information recorded on a servo surface will easily slip off a track if the environment of the unit changes, in particular, if ambient temperature changes from low to high, or from high to low. If the data head slips off a track, no data will be read.

To prevent such data head offtrack due to an ambient temperature change, an offset (an offtrack quantity) of the data head with respect to an ontrack position is found at regular intervals by reading servo information recorded on a disk surface.

When accessing a track for reading or writing data, an offset correction operation is carried out to shift a selected data head to remove an offset.

Even if a positional deviation occurs between a servo surface and a data surface due to a change in ambient temperature, the above technique may control the data head to an ontrack position.

A sensitivity of reading signals on the servo information on the data surface is dependent on head clearance and amplifier characteristics, so that a proportional coefficient based on a fixed sensitivity is insufficient to correctly detect an offtrack state. An improvement is expected in this regard.

The offset to be used for the offset correction is measured according to an interrupt that is carried out according to a time schedule set according to, for example, changes in ambient temperature. During the measurement of the offset, an access command such as a write or read command from a host unit must be queued until the measurement process is completed. This disadvantage must be solved.

In a magnetic disk unit, a rotary shaft of a spindle motor has, for example, four magnetic disks, which are rotated at a constant speed.

Among the magnetic disks, both sides of upper three disks and an upper side of the bottom disk have data surfaces, and a lower side of the bottom disk has a servo surface.

Data heads are disposed on the data surfaces of the magnetic disks, and a servo head is disposed on the servo surface.

The data heads and servo head are together driven by a voice coil motor (hereinafter referred to as the VCM), to cross tracks on the magnetic disks.

The servo surface on which the servo head is disposed has servo information recorded at every cylinder position. Signals read by the servo head provide positional signals indicating the track where the servo head is located.

The data surfaces on which the data heads are disposed have servo information, which is recorded on tracks of a specific cylinder or in a vacant space of a sector of every cylinder, and used to detect offsets of the data heads.

The servo head and data head 2 are on a cylinder center, so that no offset correction is needed. Due to a difference in expansion coefficients of metals used for a head actuator, the center of the data head usually deviates from the cylinder center where the servo head is located.

The offset of the data head may involve:

(1) a thermal offset caused by a difference in expansion coefficients of the head actuator by ambient temperature;
(2) an external force offset caused by an external force applied on the head actuator; and
(3) an offset caused by magnetic forces of magnets that change depending on the rotational position of the VCM.

An offset of the data head is measured during operation of the magnetic disk unit, and stored in a memory when positioning the head, the measured offset is removed by shifting the head, thereby correctly positioning the data head on the cylinder center.

The thermal offset of the above (1) may be measured for each data head, and the offset of one of the selected data heads may be corrected.

The external force offset of the above (2) must be measured for a specific head on all cylinders in principle. This, however, is troublesome, so that offsets of the head are measured for a predetermined number of cylinders, and the measured offset of a target cylinder is removed during a seek operation by supplying a predetermined current to the VCM to control speed.

The seek operation for removing the external force offset is disclosed in, for example, Japanese Unexamined Patent Publication (Kokai) No. 62-149082.

The servo information recorded on a data surface of a conventional magnetic disk unit is as follows. That is, first servo information A for a certain frequency signal, for example, a maximum write frequency signal is recorded on an optional track on the data surface at a position X $\mu$m outward from the ontrack position of a data head, and second servo information B at a position X $\mu$m inward from the ontrack position.

The servo information may be recorded on a specific track on a data surface, or in a vacant space of every sector on a data surface.

When the data head is ontrack, the head evenly reads the servo information A and B to provide identical signals $V_A$ and $V_B$.

When the data head is Y μm offtrack outwardly, the head reads the servo information A more than the servo information B, to provide a large signal $V_A$ and a small signal $V_B$.

When the data head is Y μm offtrack inwardly, the head reads the servo information B more than the servo information A, to provide a large signal $V_B$ and a small signal $V_A$.

A servo control processor reads a differential signal $(V_A - V_B)$ of the signals $V_A$ and $V_B$ read by the data head and determines an offset.

A relationship between the offset and the differential signal $(V_A - V_B)$ can be represented with a certain proportional coefficient as indicated with a continuous line.

An output of the data head changes depending on a floating quantity of the head, a fluctuation in a head core width, and a circumferential speed. Accordingly, the relationship between the offset and the differential signal $(V_A - V_B)$ based on the servo information is not expressible with a constant proportional coefficient but differs from data head to data head. For example, some data head shows a poor sensitivity, i.e., a low proportional coefficient.

The conventional technique that applies a constant proportional coefficient on output characteristics of every data head, therefore, cannot accurately correct an offset.

This problem may be solved by an AGC region disposed in front of the servo information A and B.

Namely, an amplifier gain for providing a constant head output is determined on the AGC region. With this amplifier gain, signals read on the servo information A and B are amplified, so that a differential signal $(V_A - V_B)$ of the read signals may be constant for the same offset even if the output of the head changes.

Even with this AGC region, a relationship between an offset and a differential signal $(V_A - V_B)$ read on the servo information A and B does not always follow the proportional constant but fluctuates depending on fluctuations in the amplifier gain and head writing and reading divergences. Namely, there is still a problem of inaccurate correction of offset.

According to the conventional offset measurement, a microprocessor for controlling a seek operation and an ontrack operation is entirely used for measuring an offset of a data head during the measurement, so that, if a host unit issues at this time a write or read command involving a seek operation, the higher command will not be executed during the measurement. Only after the measurement, the higher command is executable. This may cause a delay in the higher command, and thus deteriorates performance of the unit.

Namely, once the offset measurement is started, a specific cylinder is sought, and a thermal offset of each data head is detected according to servo information recorded on data surfaces.

For measuring an external force offset, all cylinders on a specific data surface are sequentially sought in principle, to detect an offset for each cylinder.

Accordingly, the offset measurement may take about several hundreds of microseconds, i.e., several hundred times of a time required for processing a higher command. In addition, the microprocessor for drive control is exclusively used for seek operations of the offset measurement. This may cause a delay in executing the higher command, thus deteriorating performance of the unit.

In particular, the offset measurement is carried out at very short intervals of, for example, one minute just after a power source is turned ON where ambient temperature widely changes. In this case, higher commands are frequently queued to deteriorate throughput.

The related arts regarding this invention are disclosed in Japanese Unexamined Patent Publication (Kokai) No. 62-266781.

SUMMARY OF THE INVENTION

To solve these problems of the conventional technique, an object of the invention concerning in first or second aspects is to provide a sensitivity correcting circuit of servo signal detection on a data surface in a magnetic disk unit, which can correctly detect an offset from servo information on the data surface even with fluctuations in a head output.

An object of the invention concerning in third or fourth aspects is to provide an offset measuring circuit in a magnetic disk unit, which processes higher commands as quckly as possible, even if offset measurement is carried out.

According to a first aspect of the invention there is provided a sensitivity correcting circuit of servo signal detection on a data surface in a magnetic disk unit having disk media each having first servo information (A) recorded thereon with an outward offset of predetermined quantity from an ontrack position and second servo information (B) with an inward offset of predetermined quantity from the ontrack position; a plurality of data heads provided in correspondence with the disk media; an offset detection means for reading signals $(V_A, V_B)$ on the first and second servo information (A, B) on one disk medium with the data head, detecting an offset of the data head by multiplying a differential signal $(V_A - V_B)$ of the read signals by a proportional coefficient K representing an output sensitivity of the data head; an offset storage means for storing the offset of each data head; and an offset correction means for correcting the position of a data head selected for reading or writing one disk medium in a way to remove the offset of the selected data head stored in the offset storage means, characterized in that the circuit comprises a sensitivity detection means disposed in the offset detection means, for outwardly offsetting one data head from an ontrack position by a given quantity (X1), reading signals $(V_A, V_B)$ on the first and second servo information (A, B), and detecting a differential signal (V1) of the read signals, then inwardly offsetting the data head from the ontrack position by a given quantity (X2), reading signals $(V_A, V_B)$ on the first and second servo information, detecting a differential signal (V2) of the read signals, and computing a proportional coefficient K for the data head according to the differential signals (V1, V2).

According to a second aspect of the invention, there is provided a magnetic disk unit using a sensitivity correcting circuit of servo signal detection on data surface having disk media each having first servo information (A) recorded thereon with an outward offset of predetermined quantity from an ontrack position and second servo information (B) with an inward offset of predetermined quantity from the ontrack position; a plurality of data heads provided in correspondence with the disk media; an offset detection means for reading signals $(V_A, V_B)$ on the first and second servo information (A, B) on one disk medium with the data head, detecting an offset of the data head by multiplying a differential signal ($V_A - V_B$) of the read signals by a proportional coefficient K representing an output sensitivity of the data head; an offset storage means for storing the offset of each data head; and an offset correction means for correcting the position of a data head selected for reading or writing one disk medium in a way to remove the offset of the selected data head stored in the offset storage means characterized in that said circuit comprises a sensitivity detection means disposed in the offset detection means, for outwardly offsetting one data head from an ontrack position by a given quantity (X1), reading signals ($V_A$, $V_B$) on the first and second servo information (A, B), and detecting a differential signal (V1) of the read signals, then inwardly offsetting the data head from the ontrack position by a given quantity (X2), reading signals ($V_A$, $V_B$) on the first and second servo information, detecting a differential signal (V2) of the read signals, and computing a proportional coefficient K for the data head according to the differential signals (V1, V2).

According to a third aspect of the invention, there is provided an offset measuring circuit in a magnetic disk unit having a plurality of disk media, a servo head provided in correspondence to one of the disk media, a plurality of data heads provided in correspondence to the other disk media, a command control section for decoding a command provided by a host unit and generating an internal command, and a drive control section for carrying out head positioning control on disk media according to the internal command provided by the command control section, characterized in that the circuit comprises an offset detection means for detecting offsets of data heads relative to a servo head according to servo information read by the data heads on data surfaces of the disk media; a measurement timing setting means for instructing the offset detection means to start a detection process according to a predetermined time schedule; and an interrupt means for interrupting, if the command control section decodes an access command such as a read or write command provided by the host unit, the offset detection process, executing the access command at first, and resuming the offset detection process after the access command is completed, when the detection process by the offset detection means is executed.

According to a fourth aspect of the invention, there is provided a magnetic disk unit using an offset measuring circuit having a plurality of disk media, a servo head provided in correspondence to one of the disk media, a plurality of data heads provided in correspondence to the other disk media, a command control section for decoding a command provided by a host unit and generating an internal command, and a drive control section for carrying out head positioning control on disk media according to the internal command provided by the command control section, characterized in that the circuit comprises an offset detection means for detecting offsets of data heads relative to a servo head according to servo information read by the data heads on data surfaces of the disk media; a measurement timing setting means for instructing the offset detection means to start a detection process according to a predetermined time schedule; and an interrupt means for interrupting, if the command control section decodes an access command such as a read or write command provided by the host unit, the offset detection process, executing the access command at first, and resuming the offset detection process after the access command is completed when the detection process by the offset detection means is executed.

Other features and advantages of the invention will be apparent from the following description with reference to the accompanying drawings.

BRIEF DESCRIPTION OF THE DRAWINGS

FIG. 10A is an explanatory diagram showing an embodiment summarizedly according to first and second aspects of the invention;

FIG. 13 comprising FIG. 13A and FIG. 13B is a block diagram of a disk drive unit in FIG. 12;

FIG. 15 is an explanatory diagram showing a storing state of proportional constants obtained by offset detection;

FIG. 16 is an explanatory diagram showing a storing state of offsets based on proportional constants obtained by the offset detection;

FIG. 18 comprising FIGS. 18A–18F is a waveform diagram showing waveforms in the conversion circuit and a position signal obtained from outputs of the conversion circuit;

Figure 21:
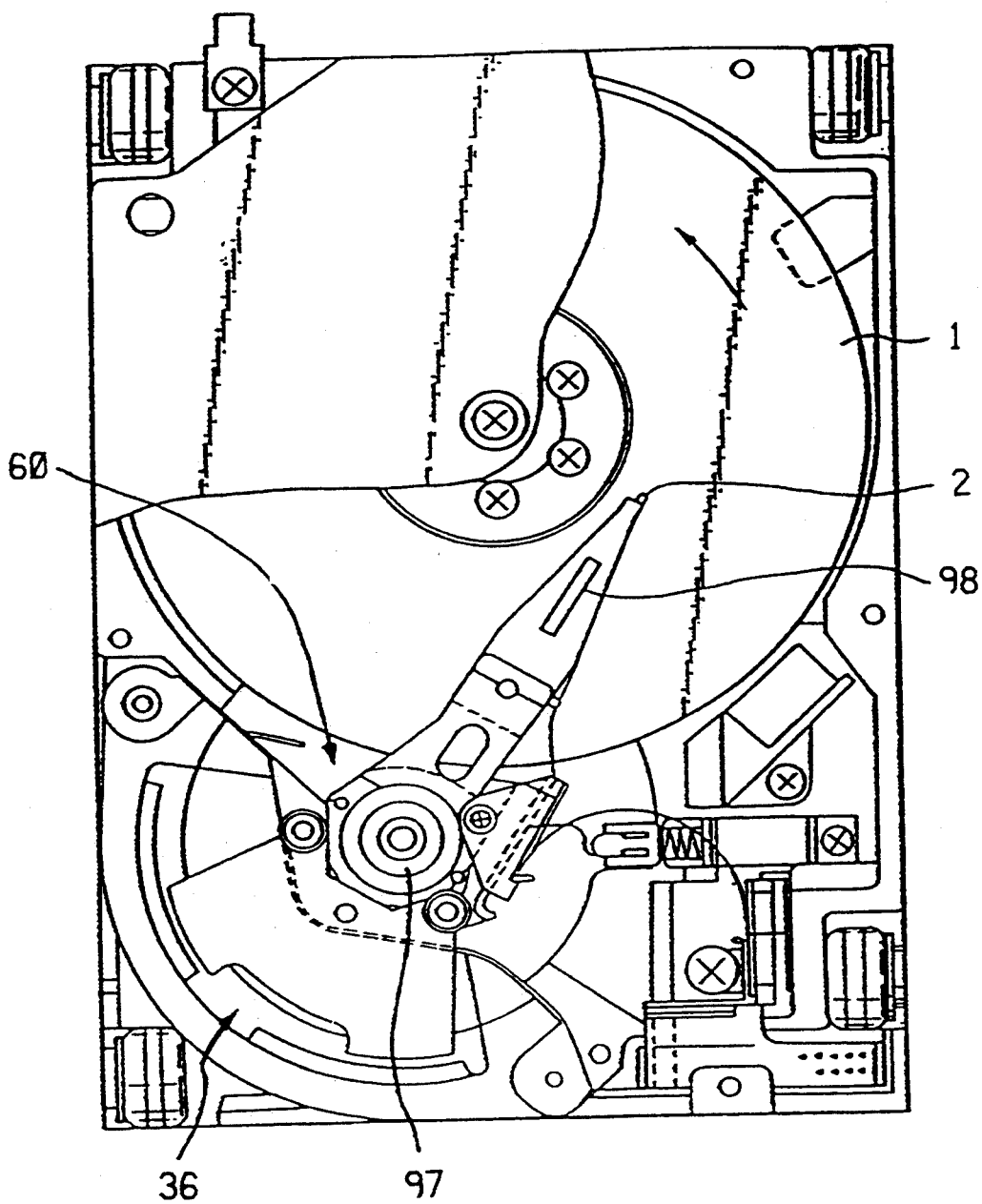
Figure 22:
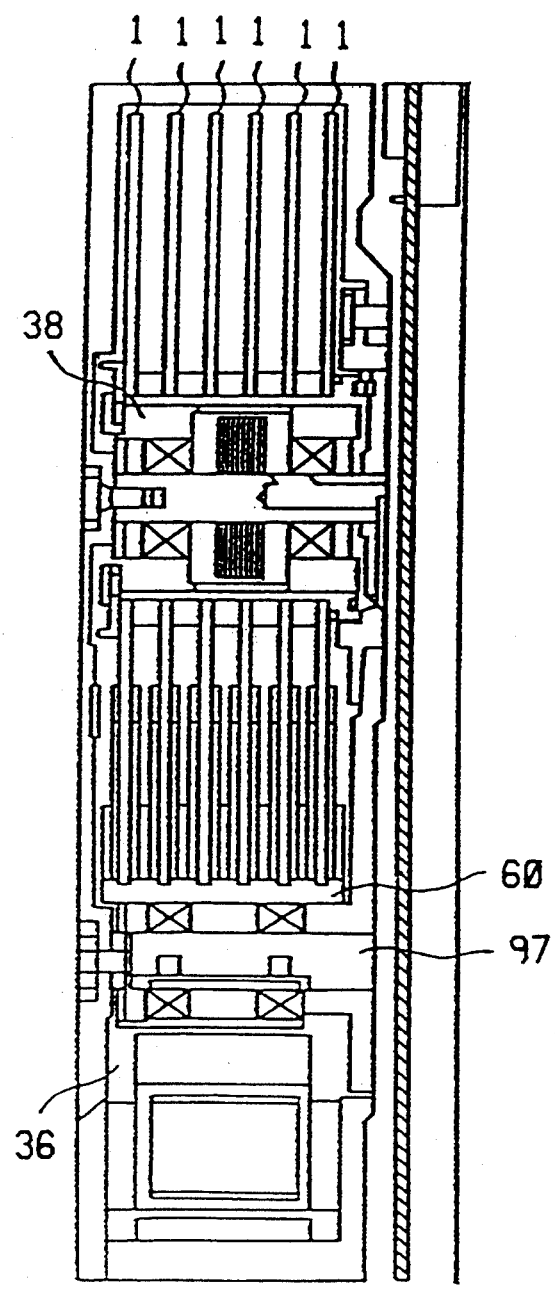

Fig, 19 (comprising FIG. 19A and FIG. 19B) is an explanatory diagram showing an offset measuring process involving an interrupt due to an access from a host unit according to an embodiment of the third and fourth aspects of the invention;

FIG. 20 comprising FIG. 20A and FIG. 20B is an explanatory diagram showing another offset measuring process involving an interrupt due to an access from a host unit according to another embodiment of the third and fourth aspects of the invention;

FIG. 21 is a sectional view of a disk enclosure in a magnetic disk unit according to the embodiment of the invention; and FIG. 22 is a sectional side view of the disk enclosure of FIG. 21.

DESCRIPTION OF THE PREFERRED EMBODIMENTS

Prior to a detailed explanation of embodiments, related arts of this invention are explained supplementally with reference to drawings, and further, a summary of the embodiments is also explained.

Figure 1:
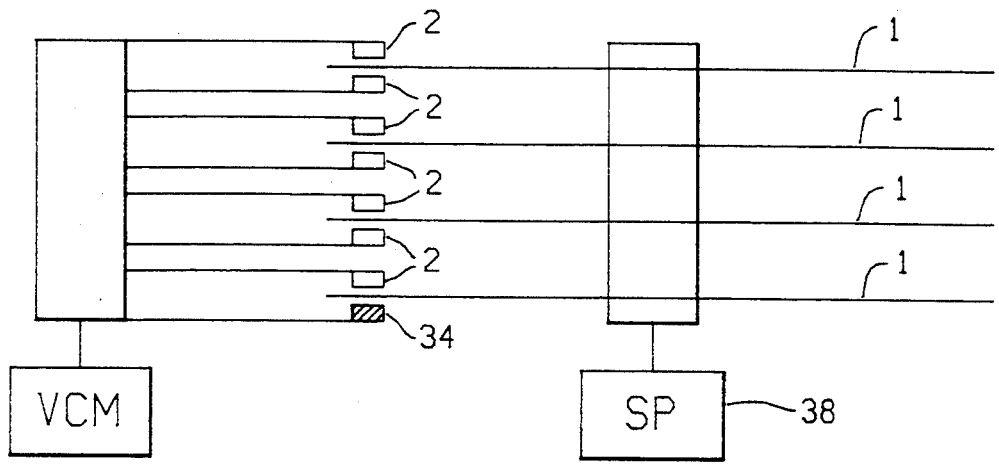
FIG. 1 is a schematic explanatory diagram of a magnetic disk unit.

FIG. 1 schematically shows a magnetic disk unit. A rotary shaft of a spindle motor 38 has, for example, four magnetic disks 1, which are rotated at a constant speed.

Among the magnetic disks 1, both sides of the upper three disks and an upper side of the bottom disk have data surfaces, and a lower side of the bottom disk has a servo surface.

Data heads 2 are disposed on the data surfaces of the magnetic disks 1, and a servo head 34 is disposed on the servo surface.

The data heads 2 and servo head 34 are together driven by a voice coil motor to cross tracks on the magnetic disks 1.

The servo surface on which the servo head 34 is disposed has servo information recorded at every cylinder position. Signals read by the servo head 34 provide positional signals indicating the track where the servo head 34 is located.

The data surfaces on which the data heads 2 are disposed have servo information, which is recorded on tracks of a specific cylinder or in a vacant space of a sector of every cylinder, and used to detect offsets of the data heads 2.

Figure 2A:
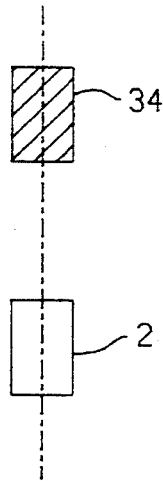
FIG. 2A, FIG. 2B, and FIG. 2C are explanatory diagrams illustrating an offset detection and an offset correction.
Figure 2B:
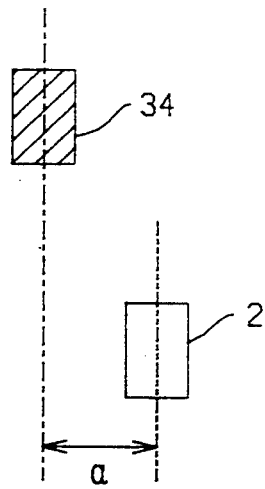
Figure 2C:
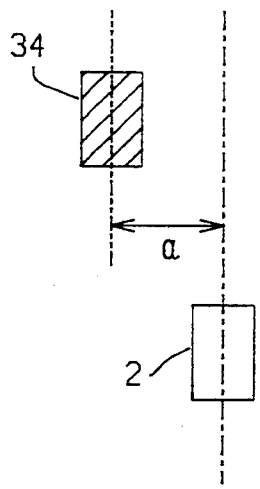

FIGS. 2A, 2B, and 2C are explanatory views showing a detection of an offset of a data head.

In FIG. 2A, the servo head 34 and data head 2 are on a cylinder center (dot-and-dash line), so that no offset correction is needed. Because of a difference in expansion coefficients of metals used for a head actuator, the center of the data head 2 usually deviates from the cylinder center where the servo head 34 is located, as shown in FIG. 2B.

The causes of the offset of the data head 2 are aforementioned.

An offset α of the data head 2 shown in FIG. 2B is measured during an operation of the magnetic disk unit, and stored in a memory. When positioning the head, the measured offset α is removed by shifting the head, thereby correctly positioning the data head 2 on the cylinder center.

Figure 3:
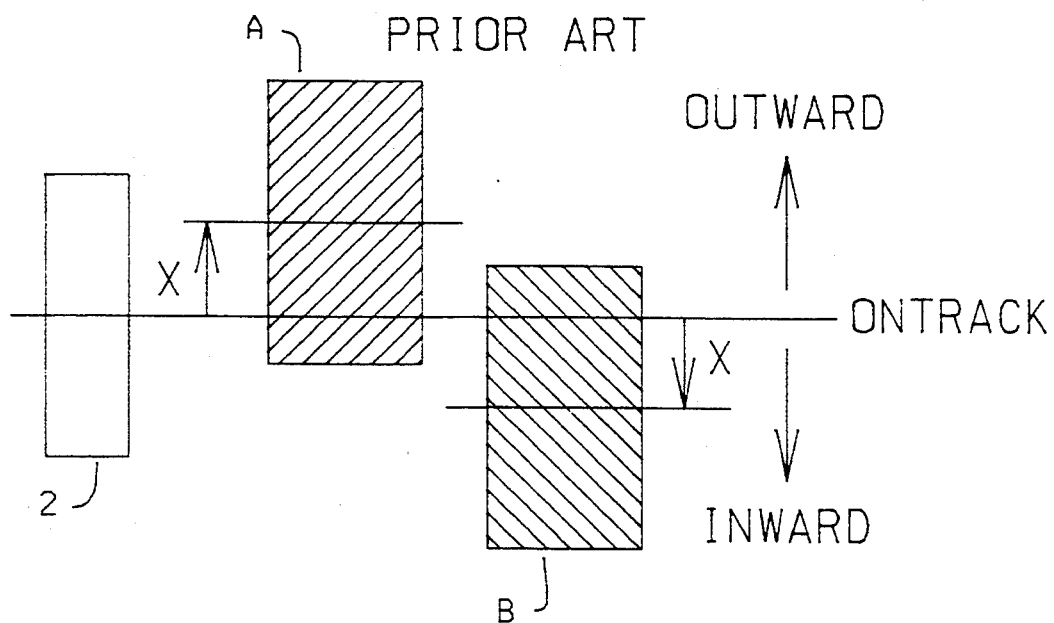
FIG. 3 is an explanatory diagram illustrating servo information stored on a data surface.

FIG. 3 shows servo information recorded on a data surface of a conventional magnetic disk unit.

In FIG. 3, first servo information A for a certain frequency signal, for example, a maximum write frequency signal is recorded on an optional track on the data surface at a position X μm outward from the ontrack position of a data head 2, and second servo information B at a position X μm inward from the ontrack position.

Figure 4:
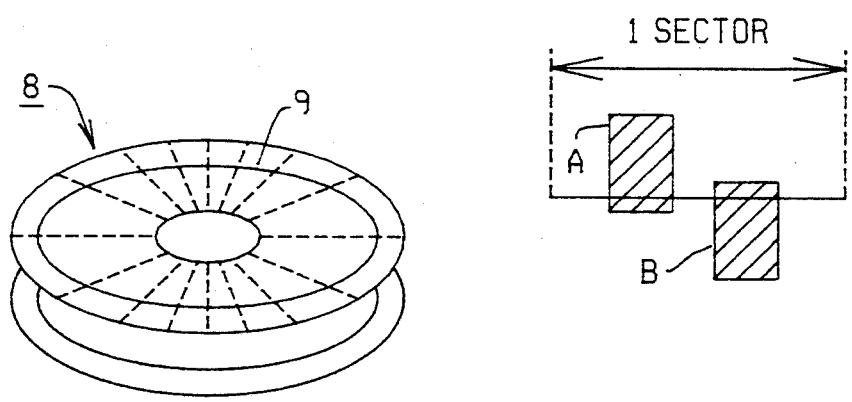
FIG. 4 is an explanatory diagram showing an example of a method of recording servo information on a data surface.
Figure 5:
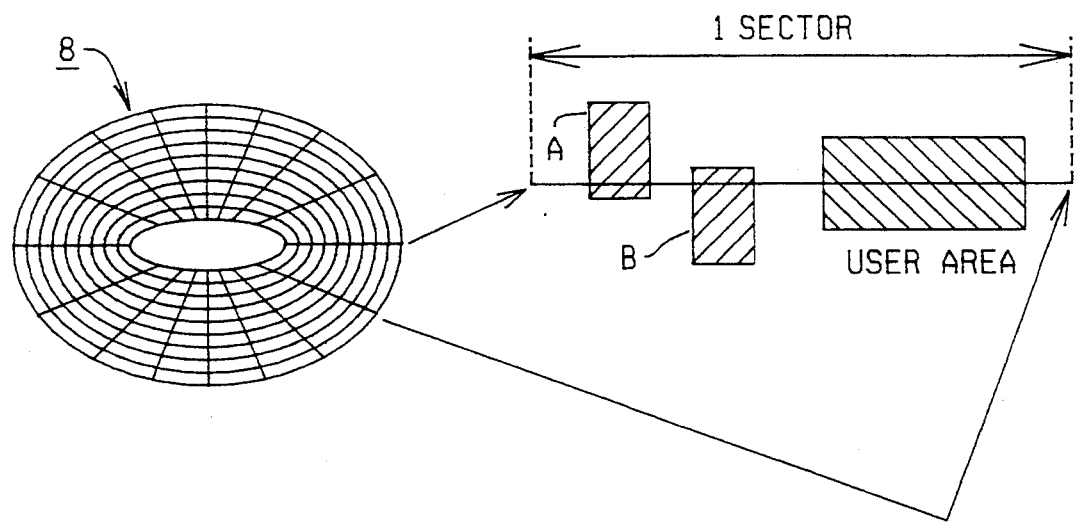
FIG. 5 is an explanatory diagram showing another method of recording servo information on a data surface.

The servo information may be recorded on a specific track 9 on a data surface 8 as shown in FIG. 4, or in a vacant space of every sector on a data surface 8 as shown in FIG. 5.

Figure 6A:
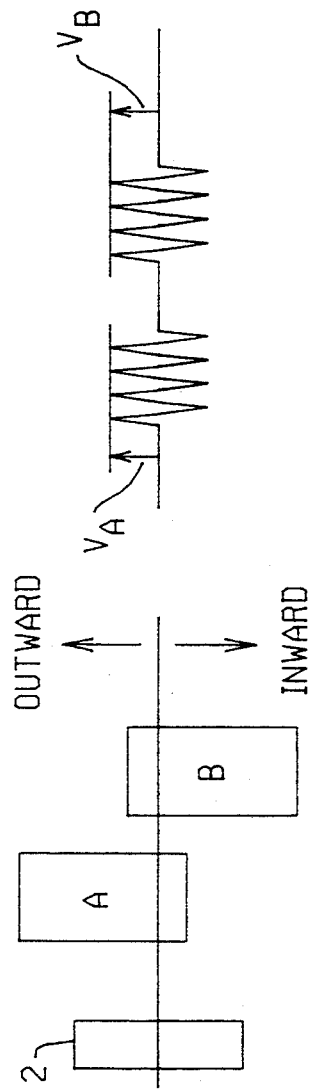
FIG. 6A, FIG. 6B, and FIG. 6C are explanatory diagrams of read signals of servo information at an offtrack of a data head.

When the data head 2 is ontrack, the head evenly reads the servo information A and B as shown in FIG. 6A, to provide identical signals $V_A$ and $V_B$.

Figure 6B:
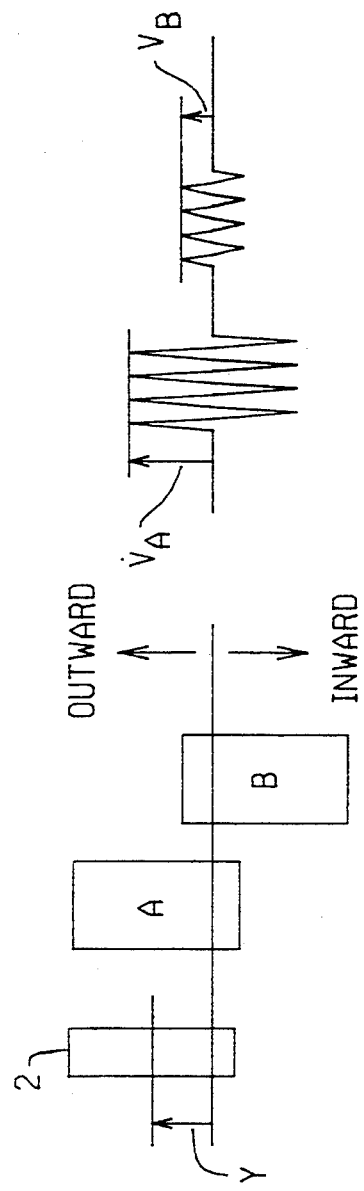

When the data head 2 is Y μm offtrack outwardly as shown in FIG. 6B, the head reads the servo information A more than the servo information B, to provide a large signal $V_A$ and a small signal $V_B$.

Figure 6C:
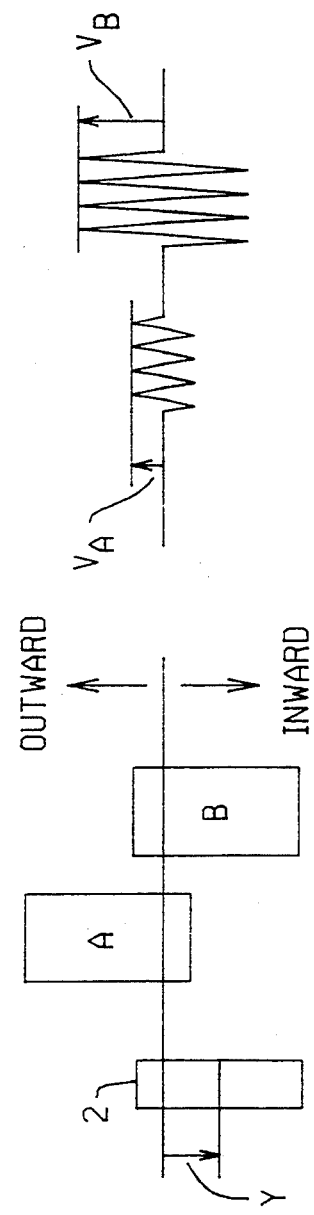

When the data head 2 is Y μm offtrack inwardly as shown in FIG. 6C, the head reads the servo information B more than the servo information A, to provide a large signal $V_B$ and a small signal $V_A$.

A servo control processor reads a differential signal $(V_A - V_B)$ of the signals $V_A$ and $V_B$ read by the data head 2 and determines an offset.

Figure 7:
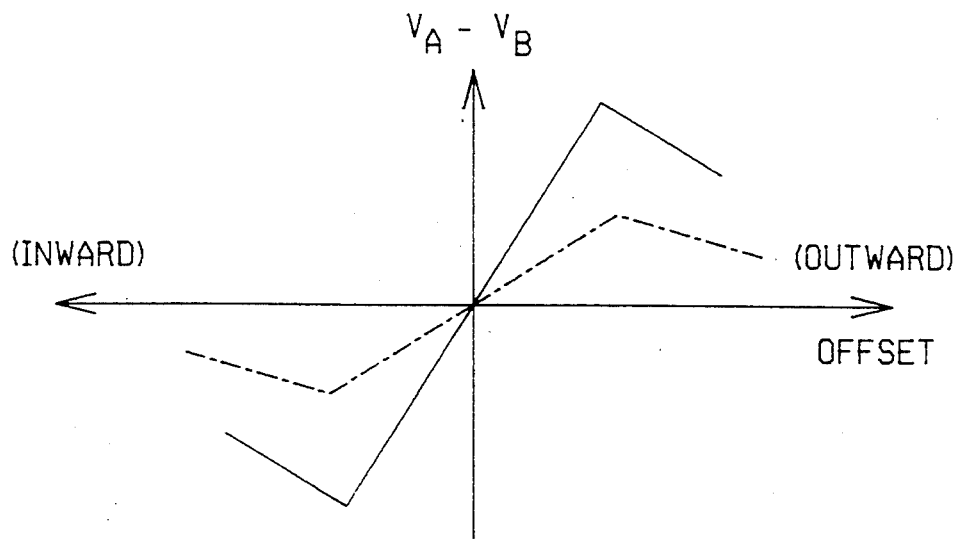
FIG. 7 is a graph showing characteristics of differential signals obtained from servo information to offsets.

A relationship between the offset and the differential signal $(V_A - V_B)$ can be represented with a certain proportional coefficient as indicated with a continuous line in FIG. 7.

An output of the data head 2 changes depending on a floating quantity of the head, a fluctuation in a head core width, and a circumferential speed. Accordingly, the relationship between the offset and the differential signal $(V_A - V_B)$ based on the servo information is not expressible with a constant proportional coefficient but differs from data head to data head. For example, some data head shows a poor sensitivity, i.e., a low proportional coefficient as indicated with a dot-and-dash line in FIG. 7.

The conventional technique that applies a constant proportional coefficient on output characteristics of every data head, therefore, cannot accurately correct an offset.

Figure 8:
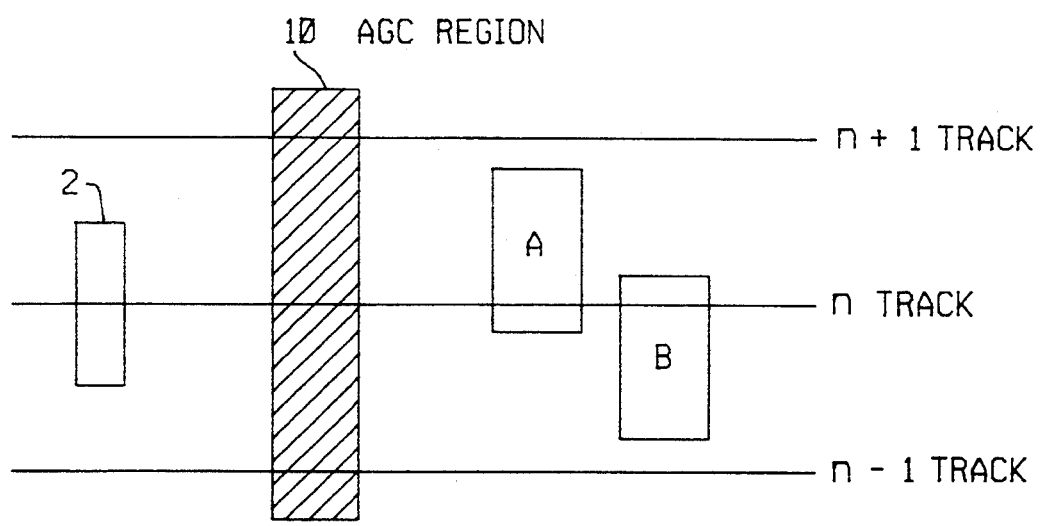
FIG. 8 is an explanatory diagram of servo information on a data surface with an AGC region.
Figure 9A:
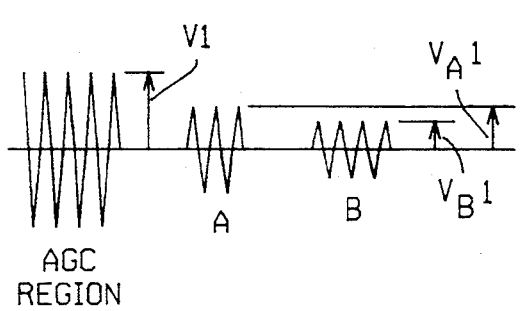
FIG. 9 is an explanatory diagram showing signals read on servo information on a data surface using the AGC region.
Figure 9B:
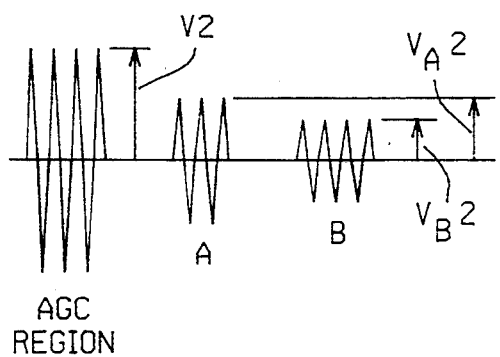
Figure 9C:
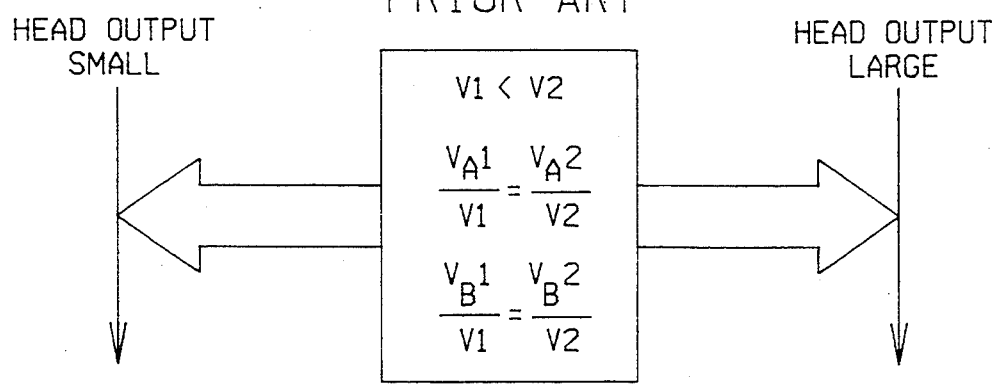
Figure 9D:
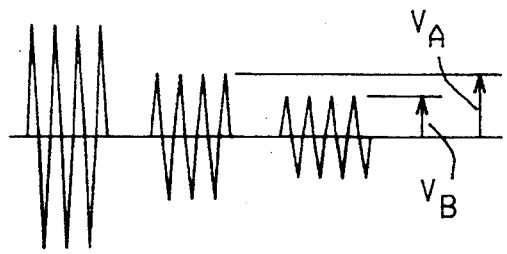
Figure 9E:
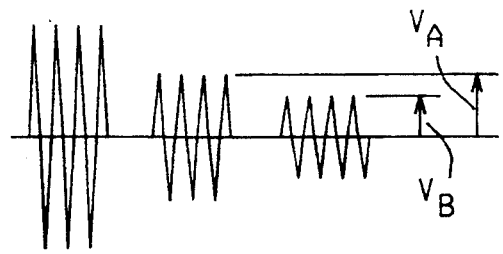

This problem may be solved by an AGC region 10 disposed in front of the servo information A and B, as shown in FIG. 8.

As shown in FIG. 9, an amplifier gain for providing a constant head output is determined on the AGC region 10. With this amplifier gain, signals read on the servo information A and B are amplified, so that a differential signal $(V_A - V_B)$ of the read signals may be constant for the same offset even if the output of the head changes.

Even with this AGC region 10, a relationship between an offset and a differential signal $(V_A - V_B)$ read on the servo information A and B does not always follow the proportional constant but fluctuates depending on fluctuations in the amplifier gain and head writing and reading divergences. Namely, there remains the inaccurate offset correction problem.

Figure 10B:
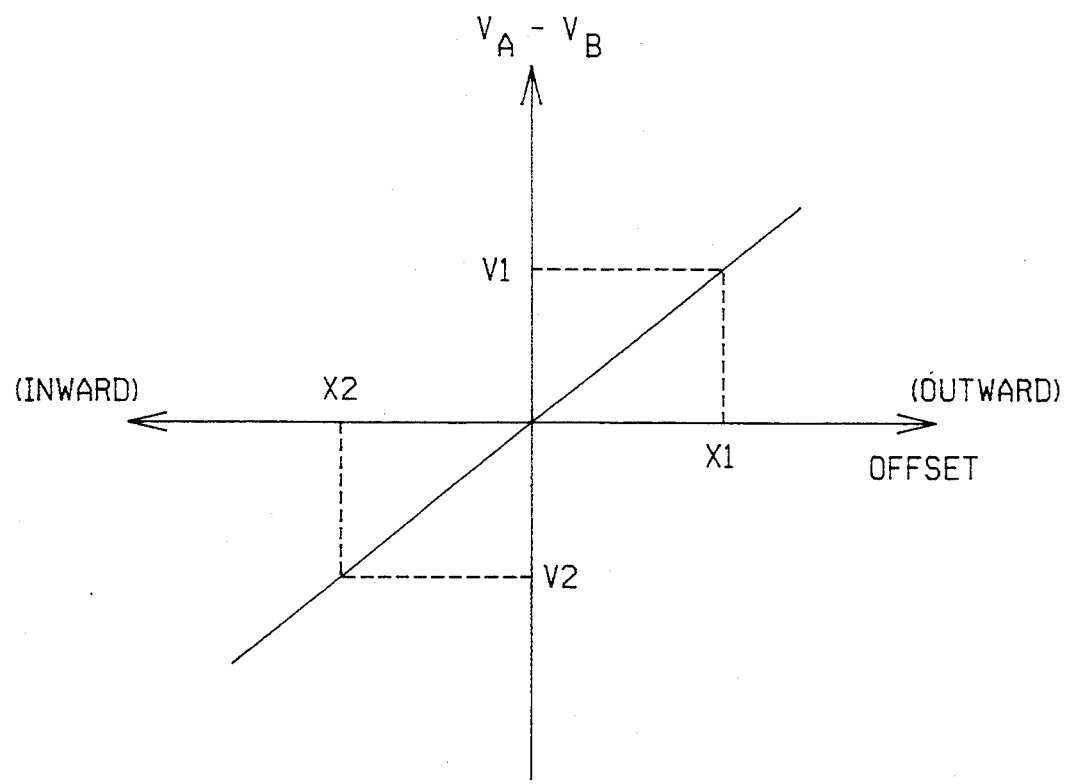
FIG. 10B is a graph illustrating a detection of a proportional constant in FIG. 10A.

A summarized explanation of an embodiment concerning first and second aspects of the invention is presented with reference to FIG. 10A.

The embodiment is applicable to a magnetic disk unit having disk media 1 each having first servo information A recorded thereon with an outward offset of predetermined quantity from an ontrack position and second servo information B with an inward offset of predetermined quantity from the ontrack position; an offset detector 3 for reading signals $V_A$ and $V_B$ on the first and second servo information A and B on one disk medium 1 with a data head 2, detecting an offset of the data head by multiplying a differential signal $(V_A - V_B)$ of the read signals by a proportional coefficient K representing an output sensitivity of the data head, and storing the offset of each data head in an offset storage 4; and an offset corrector 5 for correcting the position of a data head 2 selected for reading or writing one disk medium 1 in a way to remove the offset of the selected data head 2 stored in the offset storage 4.

A circuit for correcting a sensitivity of servo signal detection on a data surface of such a magnetic disk unit comprises a sensitivity detector 6 disposed in the offset detector 3, for outwardly offsetting one data head 2 from an ontrack position by a given quantity X1, reading signals $V_A$ and $V_B$ on the first and second servo information A and B, and detecting a differential signal V1 of the read signals. The sensitivity detector 6 then inwardly offsets the data head 2 from the ontrack position by a given quantity X2, reads signals $V_A$ and $V_B$ on the first and second servo information, detects a differential signal V2 of the read signals, and computes a proportional coefficient K for the data head according to the differential signals V1 and V2.

The sensitivity detector 6 computes the proportional coefficient K as follows:

$$K = (X1 - X2)/(V1 - V2)$$

With the outward shift X1, inward shift X2, differential signal V1 of the signals read on the first and second servo information A and B with the offset X1, and differential signal V2 of the signals read on the first and second servo information A and B with the offset X2.

The sensitivity detector 6 stores the respective proportional coefficients K of the data heads in a sensitivity storage 7.

The sensitivity detector 6 detects a proportional coefficient K for one data head 2 at first, reads signals on the first and second servo information A and B with the data head 2 at the ontrack position, obtains a differential signal $(V_A - V_B)$, computes an offset of the data head by multiplying the differential signal $(V_A - V_B)$ by the proportional coefficient K, and stores the offset in the offset storage 4.

According to the embodiment, a data head 2 whose offset is to be detected is controlled to an ontrack position according to servo information read out of a servo disk, and then the data head is moved for offset detection.

The sensitivity correcting circuit of servo signal detection on a data surface in the magnetic disk unit forcibly shifts a head position at least two times for every data head to obtain differential signals V1 and V2 of signals read on the servo information A and B, and finds an offset of the data head with use of a proportional coefficient (sensitivity) obtained from actual outputs of the data head. Accordingly, the embodiment can set a proportional coefficient specific to each data head even if the output of the data head fluctuates, and correctly detect an offset of the data head. Thereafter, the embodiment corrects the offset and accurately puts the data head on a track in reading or writing the track even if there is a change in ambient temperature.

Figure 11:
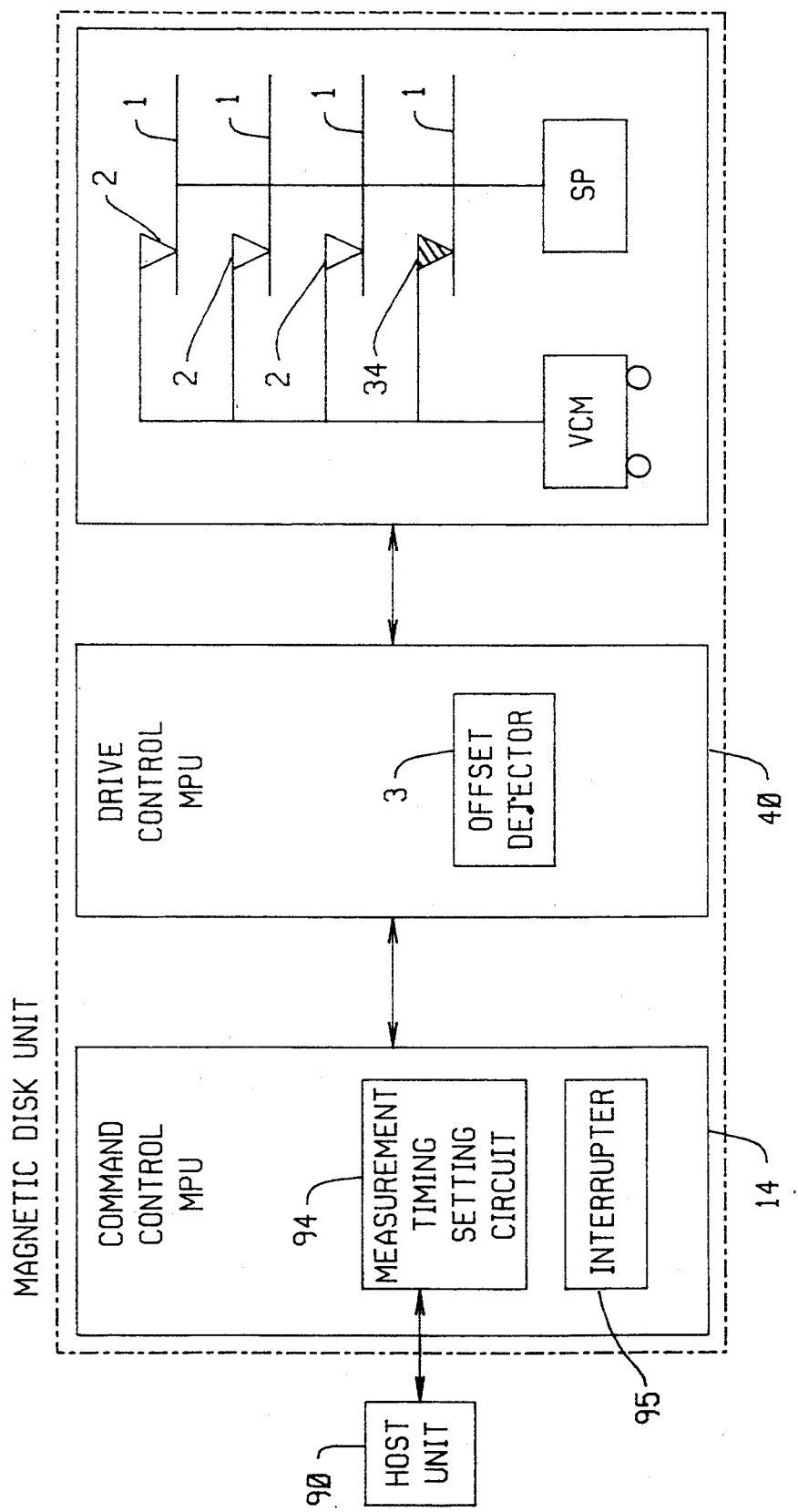
FIG. 11 is an explanatory diagram showing an embodiment summarized according to third and fourth aspects of the invention.

A summarized explanation of an embodiment concerning third and fourth aspects of the invention is presented with reference to FIG. 11.

The embodiment is applicable for a magnetic disk unit having a command control microprocessor unit (MPU) 14 for decoding a command provided by a host unit 90 and generating an internal command, and a drive control MPU 40 for carrying out head positioning control on disk media 1 according to the internal command provided by the command control MPU 14.

An offset measuring circuit according to the embodiment applicable for such a magnetic disk unit comprises an offset detector 3 for detecting offsets of data heads 2 relative to a servo head 34 according to servo information read by the data heads 2 on data surfaces of the disk media 1; a measurement timing setting circuit 94 for instructing the offset detector 3 to start a detection process according to a predetermined time schedule; and an interrupter 5 for interrupting, if the command control MPU 14 decodes a read or write command provided by the host unit 90, the offset detection process, executing the higher command at first, and resuming the offset detection process after the higher command is completed.

The offset detector 3 carries out the offset detection process on the data heads 2 in predetermined order, and when receiving an interrupt instruction from the interrupter 95, interrupts the process after detecting an offset of the data head presently being measured.

The offset detector 3 obtains a differential signal $(V_A - V_B)$ of signals read on first and second servo information pieces A and B that are offset in different directions by a predetermined quantity from a track center read by one data head 2 on a data surface, multiplies the differential signal $(V_A - V_B)$ by a given proportional coefficient K, and detects an offset of the data head.

The measurement timing setting circuit 95 provides measurement timing at intervals depending on changes in ambient temperature just after a power source of the unit is turned ON.

The interrupter 95 resumes the interrupted offset detection process, provided that the host unit 90 does not issue a command for a predetermined continuous time.

The offset measuring circuit in a magnetic disk unit according to the embodiment with the above arrangement carries out the offset measurement in the magnetic disk unit according to a predetermined time schedule. If the host unit provides a write or read command during the offset measurement, the system interrupts the offset measurement, positions a head through a seek operation according to the higher command, and executes the write or read command with a priority.

Accordingly, the embodiment minimizes a wait time of execution of the higher command due to the offset measurement, to thereby improve the throughput and performance of the unit without deteriorating the offset measuring function.

Figure 12:
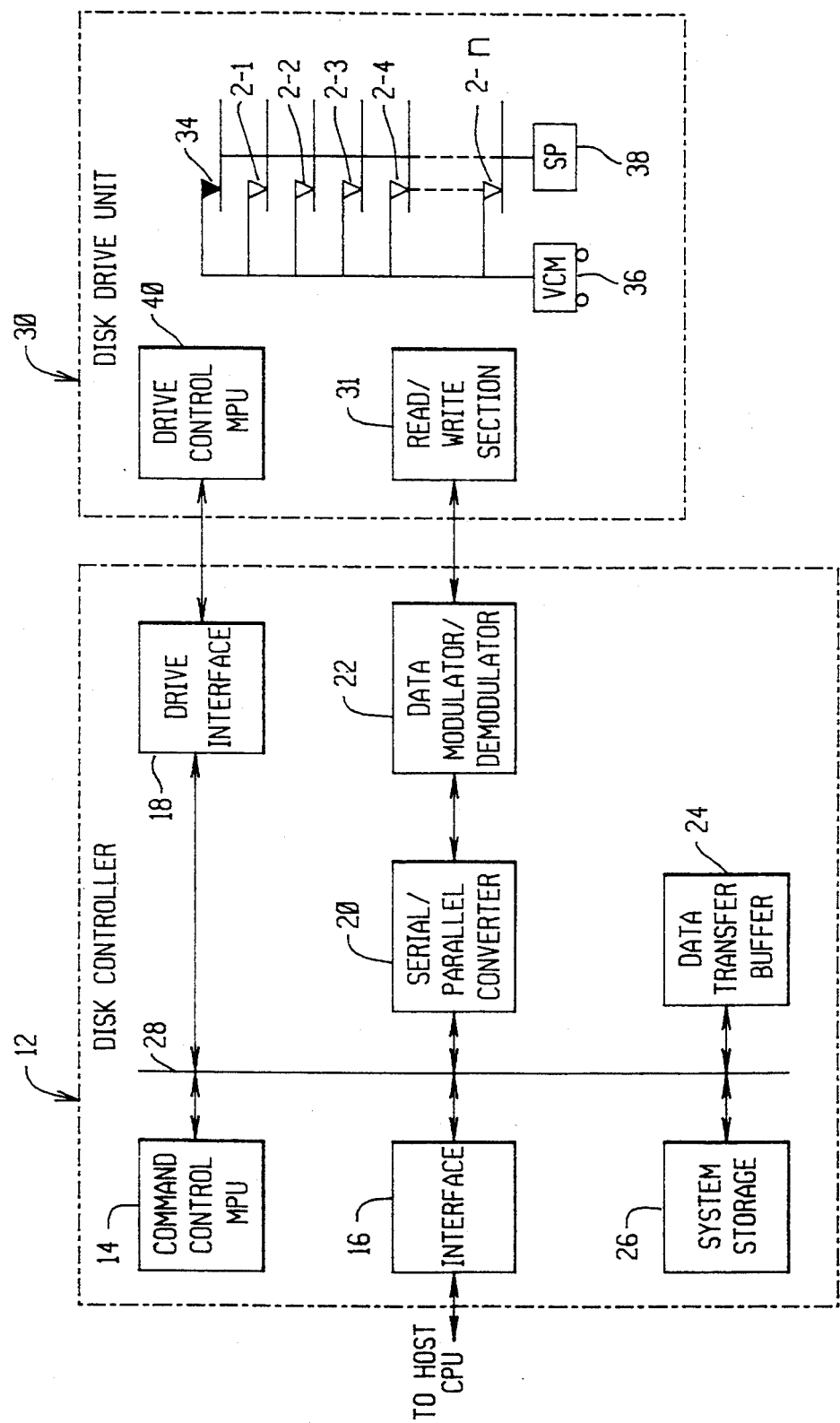
FIG. 12 is a block diagram of a magnetic disk unit according to the embodiments of the invention.

FIG. 12 is a general schematic view showing a magnetic disk unit according to an embodiment concerning first and second aspects of the invention.

In FIG. 12, the magnetic disk unit mainly comprises a disk controller 12 and a disk drive unit 30.

The disk controller 12 incorporates a command control MPU 14 for carrying out centralized control.

The command control MPU 14 is connected to, through an internal bus 28, a higher interface 16, a drive interface 18 to the disk drive unit 30, a serial/parallel converter 20, a data transfer buffer 24, and a system storage 26.

The drive interface 18 transfers control commands from the command control MPU 14 to the disk drive unit 30.

The serial/parallel converter 20 transfers write or read data to and from the disk drive unit 30 through a data modulator/demodulator 22.

The serial/parallel converter 20 and data modulator/demodulator 22 usually form a VFO (variable frequency oscillator) section.

Write or read data is once stored in the data transfer buffer 24 and then transferred to the disk drive unit 30 or a host CPU.

The disk drive unit 30 has a drive control MPU 40 and READ/WRITE section 31. A spindle motor (SP) 38 rotates a plurality of magnetic disks 1 serving as storage media at a constant speed. Heads are arranged for the magnetic disks 1 and moved across tracks of the disks 1 by a voice coil motor (VCM) 36.

A top one of the heads is a servo head 34, and the remaining ones are data heads 2 which are referred 2-1 to 2-n in detail.

The servo head 34 reads a servo disk among the magnetic disks 1. Servo information is recorded at all cylinder positions (all tracks) on a servo surface.

The data heads 2-1 to 2-n write or read data disks among the magnetic disks 1. Servo information is recorded on each data surface as shown in, for example, FIGS. 4 and 5. The servo information on the data surface comprises, as shown in FIG. 3, first servo information A for a certain frequency signal, for example, a maximum write frequency signal recorded at a position X $\mu$m outwardly shifted from an ontrack position of the data head 2, and second servo information B recorded at a position X $\mu$m inwardly shifted from the ontrack position.

FIG. 13, which comprises FIG. 13A and FIG. 13B, is a schematic view showing the disk drive unit 30 of the embodiment of FIG. 12.

In FIG. 13, the disk drive unit 30 has a microprocessor (MPU) 40 serving as a main control section.

A disk enclosure (DE) 56 has a head actuator 60 driven by the voice coil motor 36. The head actuator 60 is connected to the servo head 34 and data heads 2-1 to 2-n.

FIG. 21 and FIG. 22 is a sectional view and a sectional side view of the disk enclosure in the magnetic disk unit, respectively. In the figure, 97 is an axis and 98 is an arm.

A servo signal read by the servo head 34 is demodulated by a servo demodulation circuit 42 into two positional signals POSN and POSQ, which are sliced by a conversion circuit 44 into a phase converting pulse and a track crossing pulse. These pulses are provided to the microprocessor 40.

The microprocessor 40 has a servo processing section that is realized by program control and includes a position detector 46, an add point 48, and a servo compensator 50.

For ontrack control that is carried out after a seek operation, the servo compensator 50 provides position control data for the voice coil motor 36 so that a positional signal from the position detector 46 may always indicate a track center. The servo compensator 50 has a function of increasing the high frequency gain of a servo signal to compensate for an advanced phase.

The position control data from the microprocessor 40 is converted by a DA converter 52 into an analog voltage whose power is amplified by a power amplifier 54 to drive the voice coil motor 36.

The microprocessor 40 has an offset detector 75, an offset storage 77, and an offset corrector 79.

The offset detector 75 carries out an offset detection process after a power source of the magnetic disk unit is turned ON, according to an interrupt carried out according to a predetermined time sequence.

The offset detection process is carried out at intervals of, for example, one minute just after the power source is turned ON with ambient temperature changing widely, ten minutes some time after that, and one hour after the temperature is stabilized and saturated.

The offset detector 75 receives a differential signal ($V_A - V_B$) based on signals read by one of the data heads 2-1 to 2-n.

The data heads 2-1 to 2-n are connected to a head selector 62, which provides, in response to a selection signal from the microprocessor 40, signals read by one of the data heads to peak hold circuits 64 and 66.

The peak hold circuit 64 holds, according to timing controlled by the microprocessor 40, a peak value $V_A$ of a signal read on the first servo information A recorded on a data surface.

The peak hold circuit 66 holds, according to timing controlled by the microprocessor 40, a peak value $V_B$ of a signal read on the second servo information B recorded on the data surface.

A differential circuit 68 provides a differential signal ($V_A - V_B$) of the output signals of the peak hold circuits 64 and 66. The differential signal ($V_A - V_B$) is converted by an AD converter 70 into digital data, which is read by the offset detector 75 of the microprocessor 40.

A data writing or reading operation with the data heads 2-1 to 2-n is carried out through a read/write control circuit 72 and a read/write circuit 74. At this time, the head selector 62 is controlled by the microprocessor 40 to let a specific data head read or write data.

Figure 14:
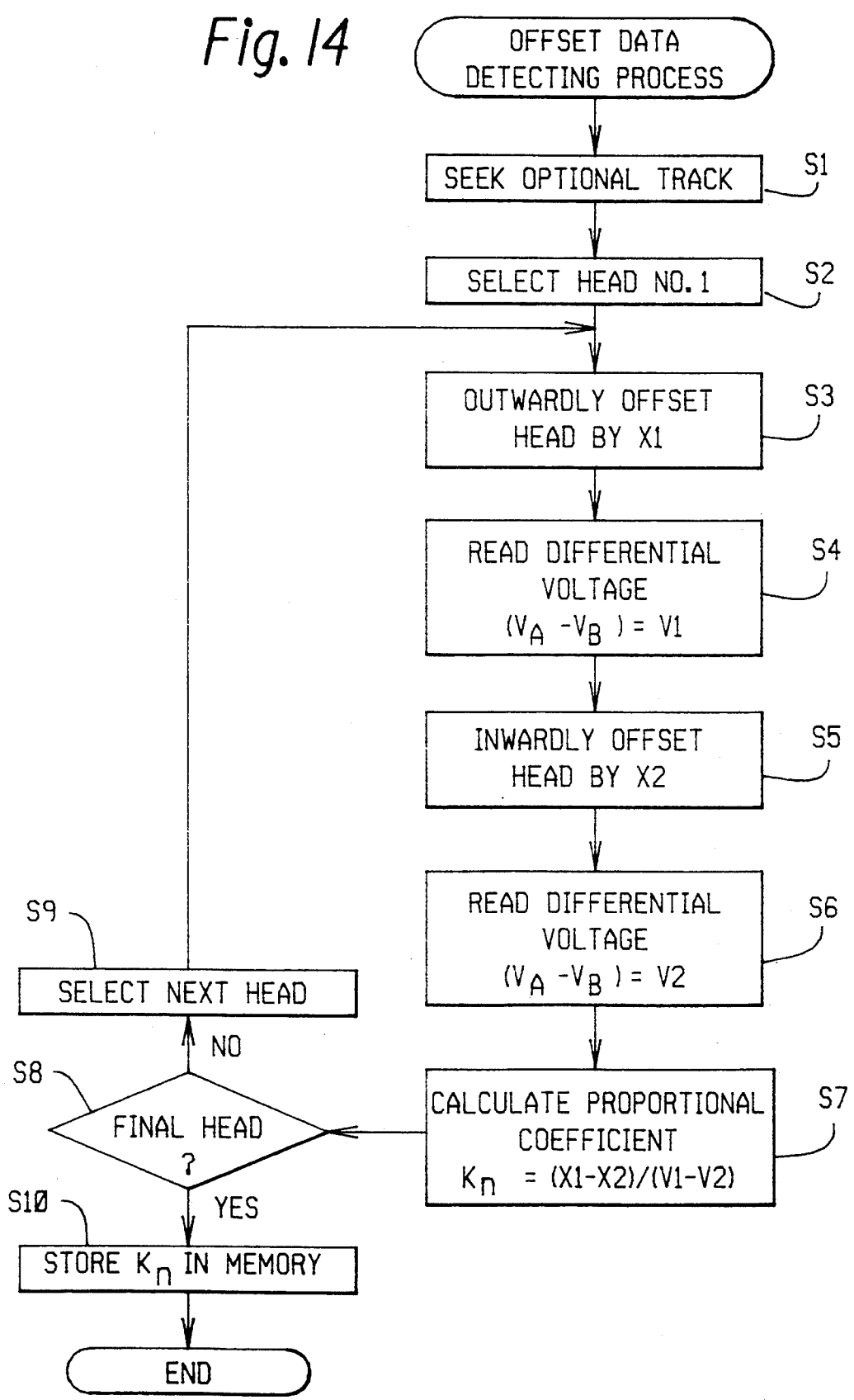
FIG. 14 is a flowchart showing a process in an offset detector in FIG. 13 according to the first and second aspects of the invention.

FIG. 14 is a flowchart showing an offset data detection process carried out by the offset detector 75 in FIG. 13.

The interrupt carried out according to the time schedule after the power source is turned ON starts the offset detection process of FIG. 14.

Step S1 causes a head to seek a predetermined track position (or cylinder position). When servo information is arranged on a data surface as shown in FIG. 4, the head moves to the specific track 9 on which the servo information is recorded. When the servo information is recorded in a vacant space of a sector as shown in FIG. 5, the head moves to an optional track position. After the head moves to the track position through the seek operation, the head is controlled to an ontrack position according to servo information provided by the servo head 34.

Step S2 selects the data head 2-1 as a No. 1 head.

In this embodiment, it is supposed that there are six magnetic disks 1. Both sides of each disk have a recording surface. Accordingly, there is one servo head 34 and there are 11 data heads 2-1 to 2-n. Namely, there are 11 data heads of No. 1 through No. 11.

Step S3 forcibly shifts the data head outwardly from the ontrack position by a fixed quantity of X1 $\mu$m. Then, Step S4 reads a differential signal V1=($V_A - V_B$) of signals read on the servo information A and B.

Step S5 forcibly shifts the data head inwardly from the ontrack position by a fixed quantity of X2 $\mu$m. Then, Step S6 reads a differential signal V2=($V_A - V_B$) of signals read on the servo information A and B.

Step S7 computes a proportional coefficient K1 indicating an output sensitivity of the No. 1 head as follows:

$$K1 = (X1 - X2)/(V1 - V2)$$

and temporarily stores the same in a system storage, etc.

Step S8 checks to see whether or not the head is the last one. If it is not the last head, Step S9 switches the head to the next one, and the process returns to Step S3. Steps S3 to S7 are repeated to detect proportional coefficients Kn.

When Step S8 detects the last head, Step S10 stores the computed proportional coefficients K1 to K11 of the heads No. 1 to No. 11 in the offset storage 77, as shown in FIG. 15.

Thereafter, each of the data heads 2-1 to 2-11 provides, on the ontrack position, a differential signal ($V_A-V_B$) from signals read on the servo information. The differential signals are multiplied by the already detected proportional coefficients K1 to K11 shown in FIG. 15, respectively, to provide offsets OF1 through OF11. The offsets OF1 through OF11 of the respective heads are stored in the offset storage 77 as shown in FIG. 16.

Once the offsets of the respective heads are stored as shown in FIG. 16, it is not particularly necessary to preserve the proportional coefficients of the respective heads shown in FIG. 15.

Referring again to FIG. 13, the offset storage 77 stores the offsets shown in FIG. 16 that have been obtained from the proportional coefficients of FIG. 15. When one of the selected data heads performs a seek operation according to a write or read instruction from the higher disk controller 12; one of the offsets corresponding to the selected data head is read out of the offset storage 77, and a correction signal for moving the head in a way to remove the offset is provided from the offset corrector 79 to the add point 48, which adds the correction signal to positional data that is based on servo information provided by the servo head 34, thereby completing the offset correction.

Even if any data surface deviates from the servo surface due to a change in ambient temperature, a corresponding data head can be correctly controlled to an ontrack position after the completion of the seek operation.

Figure 17:
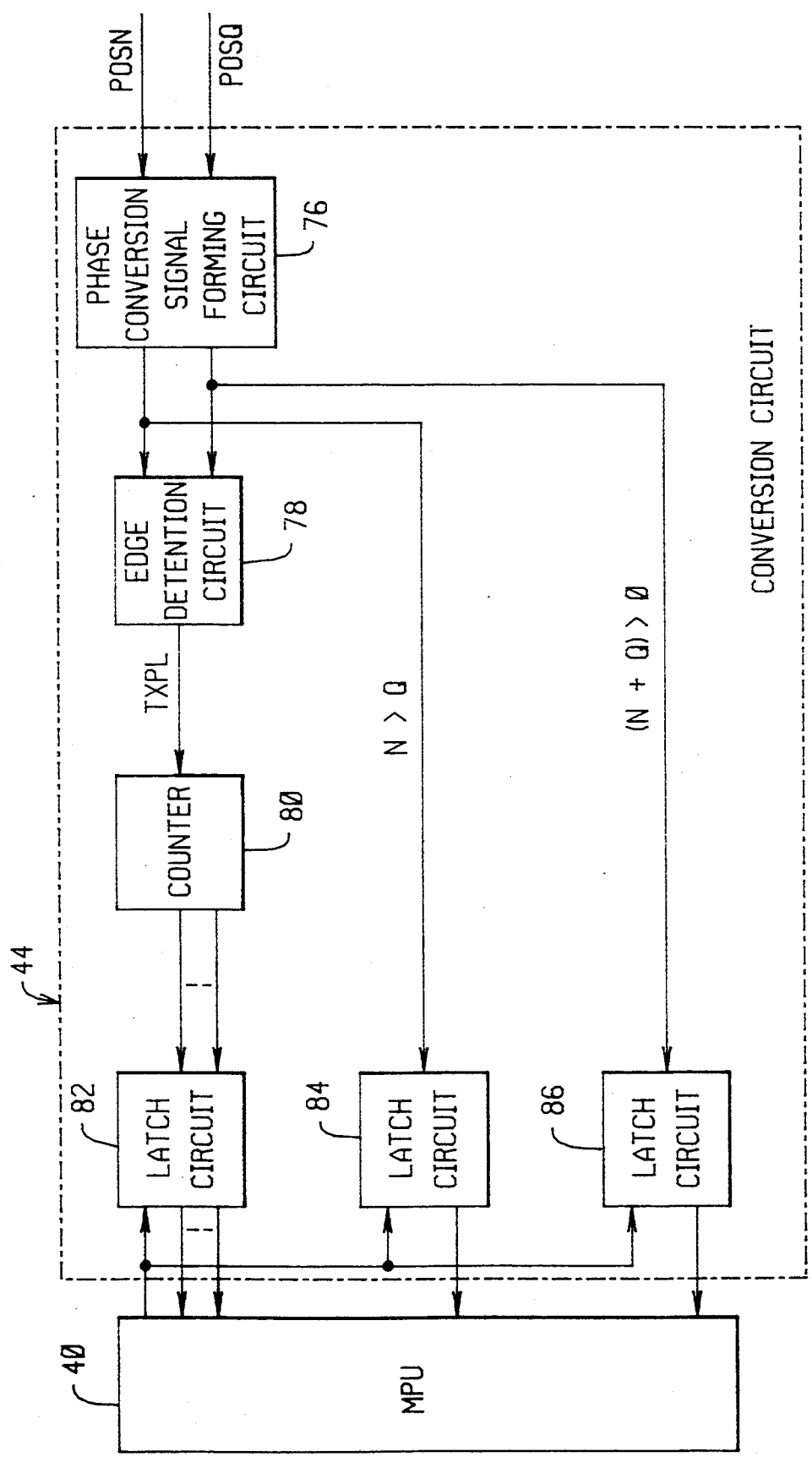
FIG. 17 is a block diagram showing a conversion circuit of FIG. 13.

FIG. 17 is a schematic view showing an example of the conversion circuit 44 of FIG. 13.

In FIG. 17, the conversion circuit 44 has a phase conversion signal forming circuit 76 for forming signals (N>Q) and {(N+Q)>0} shown in FIG. 18 according to the positional signals POSN and POSQ provided by the servo demodulation circuit 42.

The two output signals from the phase conversion signal forming circuit 76 are provided to an edge detection circuit 78, which provides a track crossing pulse TXPL shown in FIG. 18 after detecting edges.

The track crossing pulse TXPL from the edge detection circuit 78 is counted by a counter circuit 80 to find the number of tracks crossed by a corresponding head.

A signal from the counter 80 and the two output signals from the phase conversion signal forming circuit 76 are provided to latch circuits 82, 84, 86, respectively.

The latch circuits 82, 84 and 86 receive a common latch control signal from the microprocessor 40, and simultaneously latch the three signals. Thereafter, the microprocessor 40 sequentially reads the latched data.

In this way, the three latch circuits 82, 84, and 86 simultaneously latch the output signals of the counter circuit 80 and phase conversion signal forming circuit 76, and the microprocessor 40 sequentially reads the latched signals. When the microprocessor 40 alternately carries out head position control and higher command execution according to timer interrupts; the head position control may be interrupted because of the time-out required to execute a higher command. Thereafter, the head position control may be resumed. In this case, there is a time lag. Even with such a time lag, it is possible to correctly continue the head position control with no influence of the time lag using the simultaneously latched data.

As explained above, irrespective of fluctuations in the outputs of data heads, the embodiments forcibly offset each data head, actually read signals through each data head, and according to the read signals, obtain proportional coefficients that determine the sensitivities of the data heads. Thereafter, the invention correctly detects data head offsets, i.e., deviations between a servo surface and data surfaces caused by a change in ambient temperature. The embodiments thus accurately carries out a write or read offset correction to realize precise ontrack control.

An embodiment concerning in third and fourth aspects of the invention is explained with reference to FIG. 12. In FIG. 12, a magnetic disk unit of this embodiment comprises a disk controller 12 and a disk drive unit 30.

The disk controller 12 incorporates a command control microprocessor 14 for carrying out centralized control.

To measure offsets according to the embodiment, the command control microprocessor 14 achieves a function of the measurement timing setting circuit 94 shown in the schematic view of FIG. 11, for providing an instruction to start offset detection according to a predetermined time schedule, and a function of the interrupter 95 for interrupting the offset detection if a read or write command from a host unit is decoded during the offset detection, executing the command at first, and resuming the offset detection after the completion of the command.

The function of the measurement timing setting circuit 94 may be realized in the disk drive unit 30.

The command control microprocessor 14 is connected to, through an internal bus 28, a higher interface 16, a drive interface 18 to the disk drive unit 30, a serial/parallel converter 20, a data transfer buffer 24, and a system storage 26.

The drive interface 18 transfers control commands from the command control microprocessor 14 to the disk drive unit 30.

The serial/parallel converter 20 transfers write or read data to and from the disk drive unit 30 through a data modulator/demodulator 22.

The serial/parallel converter 20 and data modulator/demodulator 22 usually form a VFO section.

Write or read data are once stored in the data transfer buffer 24 and then transferred to the disk drive unit 30 or a host CPU.

The disk drive unit 30 has a drive control microprocessor 40 and a read/write section 31. A spindle motor (SP) 38 rotates a plurality of magnetic disks 1 serving as storage media at a constant speed. Heads are arranged for the magnetic disks 1 and moved across tracks of the disks 1 by a voice coil motor (VCM) 36.

A top one of the heads is a servo head 34, and the remaining ones are data heads 2-1 to 2-n.

The servo head 34 reads a servo disk among the magnetic disks 1. Servo information is recorded at all cylinder positions (all tracks) on a servo surface.

The data heads 2-1 to 2-n write or read disks having data surfaces among the magnetic disks 1.

The servo information is recorded sector by sector on each data surface. Namely, as shown in FIG. 3, first servo information A for a certain frequency signal, for example, a maximum write frequency signal is recorded at a position X $\mu$m outwardly shifted from an ontrack position of the data head 2 on a specific track on a data face of a magnetic disk, and second servo information B is recorded at a position X μm inwardly shifted from the ontrack position.

As shown in FIG. 4, the servo information may be recorded on a specific track 9 on a data surface 8, or as shown in FIG. 5, in a vacant space of every sector on a data surface 8.

When the data head 2 is ontrack, the head evenly reads the servo information A and B as shown in FIG. 6A, to provide identical signals $V_A$ and $V_B$.

When the data head 2 is outwardly offtrack as shown in FIG. 6B, the head reads the servo information A more than the servo information B, to provide a large signal $V_A$ and a small signal $V_B$.

When the data head 2 is inwardly offtrack as shown in FIG. 6C, the head reads the servo information B more than the servo information A, to provide a large signal $V_B$ and a small signal $V_A$.

The drive control microprocessor 40 disposed in the disk drive unit 30 reads a differential signal $(V_A-V_B)$ of signals $V_A$ and $V_B$ read by the data head 2 during the offset measurement, and detects an offset.

In this case, a relationship between the offset and the differential signal $(V_A-V_B)$ is represented by a constant proportional coefficient (inclination) K as shown in FIG. 7 (continuous line).

Accordingly, an offset α can be calculated by multiplying a differential signal $(V_A-V_B)$ of signals read on the servo information A and B on a data surface by the proportional coefficient.

Namely, an offset α for the servo information on a data surface is calculated as follows:

$$\alpha = K \cdot (V_A - V_B)$$

FIG. 13, which comprises FIG. 13A and FIG. 13B, is a schematic view showing the disk drive unit 30 of the embodiment of FIG. 12.

In FIG. 13, the disk drive unit 30 has the drive control microprocessor (MPU) 40 serving as a main control section.

A disk enclosure (DE) 56 has a head actuator 60 driven by the voice coil motor 36. The head actuator 60 is connected to the servo head 34 and data heads 2-1 to 2-n.

A servo signal read by the servo head 34 is demodulated by a servo demodulation circuit 42 into two positional signals POSN and POSQ, which are given to a conversion circuit 44.

As shown in FIG. 18, the conversion circuit 44 converts the positional signals POSN and POSQ from the servo demodulation circuit 42 into:

(N>Q) signal, and

{(N+Q)>0} signal.

Edges of these two signals are detected to generate a track crossing pulse TXPL with which a counter counts the number of tracks crossed by the head. In the Figure CY designates a cylinder.

The signals from the conversion circuit 44 are read by a position detector 46 of the microprocessor 40, to generate positional data (positional signal) that linearly changes for each track as shown in FIG. 18.

It is naturally possible to detect a head speed according to a period of the track crossing pulse TXPL provided by the conversion circuit 44.

The microprocessor 40 has a servo processing section that is realized by program control and includes the position detector 46, an add point 48, and a servo compensator 50.

The position detector 46 carries out speed control for a seek operation and position control for an ontrack operation.

Namely, it moves a head to a target track through the seek operation by feedback control of a target speed and a head moving speed. Once the head reaches the target track through the seek operation, it switches the speed control to the position control to put the head on an ontrack position.

For the ontrack control on the target track, the servo compensator 50 provides position control data for the voice coil motor 36 so that the positional signals of FIG. 18 from the position detector 46 may always indicate the center of the track.

The servo compensator 50 has a function of increasing the high frequency gain of a servo signal to compensate for an advanced phase.

The speed or position control data from the drive control microprocessor 40 is converted by a DA converter 52 into an analog voltage whose power is amplified by a power amplifier 54 to drive the VCM 36.

The microprocessor 40 has an offset detector 75, an offset storage 77, and an offset corrector 79.

The offset detector 75 carries out an offset detection process whenever receiving an internal command to start a measurement from the command control microprocessor 14 of FIG. 12 after a power source of the magnetic disk unit is turned ON.

The offset detection process is carried out at short intervals just after the power source is turned ON with ambient temperature changing widely, and at long intervals, for example, once an hour after the temperature is stabilized and saturated.

The offset detector 75 receives a differential signal $(V_A-V_B)$ of signals read by one of the data heads 2-1 to 2-n.

The data heads 2-1 to 2-n are connected to a head selector 62, which sequentially provides, in response to switching signals from the drive control microprocessor 40, signals read by the data heads 2-1 to 2-n to peak hold circuits 64 and 66 one by one.

The peak hold circuit 64 holds, according to timing controlled by the microprocessor 40, a peak value $V_A$ of a signal read on the first servo information A on a data surface.

The peak hold circuit 66 holds, according to timing controlled by the microprocessor 40, a peak value $V_B$ of a signal read on the second servo information B on the data surface.

A differential circuit 68 provides a differential signal $(V_A-V_B)$ of the output signals of the peak hold circuits 64 and 66. The differential signal $(V_A-V_B)$ is converted by an AD converter 70 into digital data, which is read by the offset detector 75 of the drive control microprocessor 40.

The offset detector 75 uses the proportional coefficient K having the characteristics shown in FIG. 7 and calculates an offset α for each of the data heads 2-1 to 2-n, if it is a thermal offset. The offsets obtained are stored in the offset storage 77 that is a RAM.

If it is an external force offset, a specific data head, for example, the data head 2-1 is selected, and an offset is detected on every predetermined number of cylinders. The offsets obtained are stored in the offset storage 77. It is naturally possible to detect offsets on all cylinders, calculate an average offset for every predetermined number of cylinders, and stores the average offsets in the storage.

A data writing or reading operation with the data heads 2-1 to 2-n is carried out through a read/write control circuit 72 and a read/write circuit 74. At this time, the head selector 62 is controlled by the microprocessor 40 to let a specific data head read or write data.

The offset measurement carried out by the offset detector 75 of the drive control microprocessor 40 of FIG. 13 will be explained with reference to a time chart of FIGS. 19A and 19B. In FIGS. 19A and 19B, thermal offsets are measured as an example.

When B1 of the command control microprocessor 14 detects measurement start time, B2 issues a seek instruction as an internal instruction for seeking a specific cylinder S on which a thermal offset is to be detected, to the drive control microprocessor 40.

Upon receiving the instruction, C1 of the drive control microprocessor 40 moves the heads onto the specific cylinder.

B3 of the command control microprocessor 14 provides an internal command to let the drive control microprocessor 40 measure a thermal offset of a head 0.

Upon receiving the instruction, C2 of the drive control microprocessor 40 detects the thermal offset of the head 0. Namely, the microprocessor 40 selects the data head 0, reads signals $V_A$ and $V_B$ on the servo information A and B on the data surface with the selected data head, obtains a differential signal $(V_A - V_B)$ of the read signals $V_A$ and $V_B$, and calculates an offset $\alpha$ by multiplying the differential signal by a given proportional coefficient K.

B4 and B5 sequentially provide offset measuring instructions for heads 1 and 2, and C3 and C4 measure the offsets.

During the offset detection in C4 according to the offset measuring instruction for the head 2 provided by B5, A1 of the host unit 90 issues a read command for a cylinder A.

Upon receiving this read command, the command control microprocessor 14 waits for the completion of the offset detection of C4 for the head 2, and issues a seek command for the cylinder A in B6 according to the higher command. Then, C5 seeks the cylinder A. Namely, the offset measurement is interrupted at C5.

When the cylinder A is sought and the heads are ontrack at there, data are read and transferred to the host unit 90 through a buffer.

When the higher read command is completed, B7 issues a seek command for the specific cylinder S, and C6 seeks the specific cylinder S. Then, to resume the interrupted offset measurement, B8 issues an offset measuring instruction for the next head 3, and C7 detects an offset of the head 3.

The offset detection is repeated up to the last head n. Bn completes a series of the offset measurements, and a normal process is resumed.

FIGS. 20A and 20B is a time chart showing an offset measuring process according to another embodiment of the invention. This embodiment also measures thermal offsets as an example. In the figure, "automatic adjustment" means the offset measuring process.

In the embodiment of FIGS. 20A and 20B, the drive control microprocessor 40 sets measurement timing and starts an interrupt process for a higher command after receiving an instruction from the command control microprocessor 14.

Namely, unlike the embodiment of FIGS. 19A and 19B, the drive control microprocessor 40 of this embodiment has an intelligent function for offset measurement.

In B1 to B6 and C1 to Cn, the command control microprocessor 14 and drive control microprocessor 40 send and receive internal commands to detect offsets, interrupt the offset detection upon receiving a higher command, and resume the offset detection upon the completion of the higher command.

According to still another embodiment of the invention, resumption of the offset measurement in B7 of FIGS. 19A and 19B and B6 of FIGS. 20A and 20B may be achieved only when the host unit 90 does not issue a command for at least a predetermined time after the completion of the preceding higher command.

When the host unit 90 issues commands at random temporally, the offset measurement may be resumed upon the completion of a presently processed higher command with no problem. When the host unit sequentially issues write or read commands, however, the higher commands and the offset measurement will be alternately carried out to deteriorate sequential access efficiency.

Accordingly, the offset measurement is resumed if no higher command is issued a predetermined time, for example 1 ms, after the completion of the present higher command.

Namely, the offset measurement will not be resumed after the end of each higher command if it is a sequential access, thereby preventing a deterioration of processing performance of the sequential access.

The numbers of magnetic disks and heads in the above embodiments are examples, and they may be properly determined.

In the above embodiments, the servo surface is formed on an end of one of a plurality of disks. The servo surface may be formed on a center disk or on any other disk.

As explained above, the embodiments interrupts offset measurement upon receiving a higher command during the measurement, and executes the higher command at first, thereby preventing a deterioration of processing performance due to the offset measurement.

We claim:

1. An offset measuring circuit in a magnetic disk unit having a plurality of disk media, a servo head provided in correspondence to one of the disk media, a plurality of data heads provided in correspondence to the other disk media, a command control section for decoding a command provided by a host unit and generating an internal command, and a drive control section for carrying out head positioning control on disk media according to the internal command provided by the command control section, comprising an offset detection means for detecting offsets of data heads relative to a servo head according to servo information read by the data heads on data surfaces of the disk media;

a measurement timing setting means for instructing the offset detection means to start a detection process according to a predetermined time schedule; and an interrupt means for interrupting, if the command control section decodes an access command provided by the host unit, the offset detection process, executing the access command at first, and resuming the offset detection process after the access command is completed when the detection process by the offset detection means is executed.

2. An offset measuring circuit in a magnetic disk unit according to claim 1, wherein the offset detection means carries out the offset detection process on the data heads in predetermined order, and when receiving an interrupt instruction from the interrupt means, interrupts the process after detecting an offset of the data head being presently measured.

3. An offset measuring circuit in a magnetic disk unit according to claim 1, wherein the offset detection means obtains a differential signal $(V_A - V_B)$ of signals read on first and second servo information pieces (A, B) that are offset in different directions by a predetermined quantity from a track center read by one data head on a data surface, multiplies the differential signal $(V_A - V_B)$ by a given proportional coefficient K, and detects an offset of the data head.

4. An offset measuring circuit in a magnetic disk unit according to claim 1, wherein the measurement timing setting means provides measurement timing at intervals that are dependent on changes in ambient temperature just after a power source of the unit is turned ON.

5. An offset measuring circuit in a magnetic disk unit according to claim 1, wherein the interrupt means resumes the interrupted offset detection process if the host unit does not issue a command for a predetermined continuous time.

6. An offset measuring circuit as claimed in claim 1, wherein the access command is a read or write command.

7. A magnetic disk unit using an offset measuring circuit having a plurality of disk media, a servo head provided in correspondence to one of the disk media, a plurality of data heads provided in correspondence to the other disk media, a command control section for decoding a command provided by a host unit and generating an internal command, and a drive control section for carrying out head positioning control on disk media according to the internal command provided by the command control section, comprising an offset detection means for detecting offsets of data heads relative to a servo head according to servo information read by the data heads on data surfaces of the disk media;

a measurement timing setting means for instructing the offset detection means to start a detection process according to a predetermined time schedule; and an interrupt means for interrupting, if the command control section decodes an access command provided by the host unit, the offset detection process, executing the access command at first, and resuming the offset detection process after the access command is completed when the detection process by the offset detection means is executed.

8. A magnetic disk drive as claimed in claim 7, wherein the access command is a read or write command.

* * * * *